US009671302B2

(12) United States Patent
Brucker et al.

(10) Patent No.: US 9,671,302 B2
(45) Date of Patent: Jun. 6, 2017

(54) COLD CATHODE IONIZATION VACUUM GAUGE

(71) Applicant: MKS Instruments, Inc., Andover, MA (US)

(72) Inventors: Gerardo A. Brucker, Longmont, CO (US); Timothy C. Swinney, Fort Collins, CO (US); Brandon J. Kelly, Longmont, CO (US)

(73) Assignee: MKS Instruments, Inc., Andover, MA (US)

( * ) Notice: Subject to any disclaimer, the term of this patent is extended or adjusted under 35 U.S.C. 154(b) by 354 days.

(21) Appl. No.: 14/500,820

(22) Filed: Sep. 29, 2014

(65) Prior Publication Data

US 2015/0091579 A1      Apr. 2, 2015

Related U.S. Application Data

(60) Provisional application No. 61/884,797, filed on Sep. 30, 2013.

(51) Int. Cl.
| | |
|---|---|
| *G01L 21/34* | (2006.01) |
| *H01J 9/50* | (2006.01) |
| *G01L 19/06* | (2006.01) |
| *H01J 41/06* | (2006.01) |

(52) U.S. Cl.
CPC .............. *G01L 21/34* (2013.01); *G01L 19/06* (2013.01); *H01J 9/50* (2013.01); *H01J 41/06* (2013.01); *Y10T 29/49007* (2015.01)

(58) Field of Classification Search
CPC .. G01L 21/34; G01L 19/06; H01J 9/50; H01J 41/06; Y10T 29/49007

USPC ................................................. 324/459–470
See application file for complete search history.

(56) References Cited

U.S. PATENT DOCUMENTS

| | | | |
|---|---|---|---|
| 6,993,973 B2* | 2/2006 | Lischer | G01L 19/0636 361/280 |
| 8,120,366 B2 | 2/2012 | Kawasaki | |
| 2010/0259273 A1 | 10/2010 | Kawasaki et al. | |
| 2015/0091580 A1 | 4/2015 | Brucker et al. | |
| 2016/0025587 A1* | 1/2016 | Andreaus | G01L 21/34 324/463 |

FOREIGN PATENT DOCUMENTS

GB          2 256 310 A       12/1992

* cited by examiner

*Primary Examiner* — Melissa Koval
*Assistant Examiner* — Rahul Maini
(74) *Attorney, Agent, or Firm* — Hamilton, Brook, Smith & Reynolds, P.C.

(57) ABSTRACT

A cold cathode ionization vacuum gauge includes an extended anode electrode and a cathode electrode surrounding the anode electrode along its length and forming a discharge space between the anode electrode and the cathode electrode. The vacuum gauge further includes an electrically conductive guard ring electrode interposed between the cathode electrode and the anode electrode about a base of the anode electrode to collect leakage electrical current, and a discharge starter device disposed over and electrically connected with the guard ring electrode, the starter device having a plurality of tips directed toward the anode and forming a gap between the tips and the anode.

25 Claims, 24 Drawing Sheets

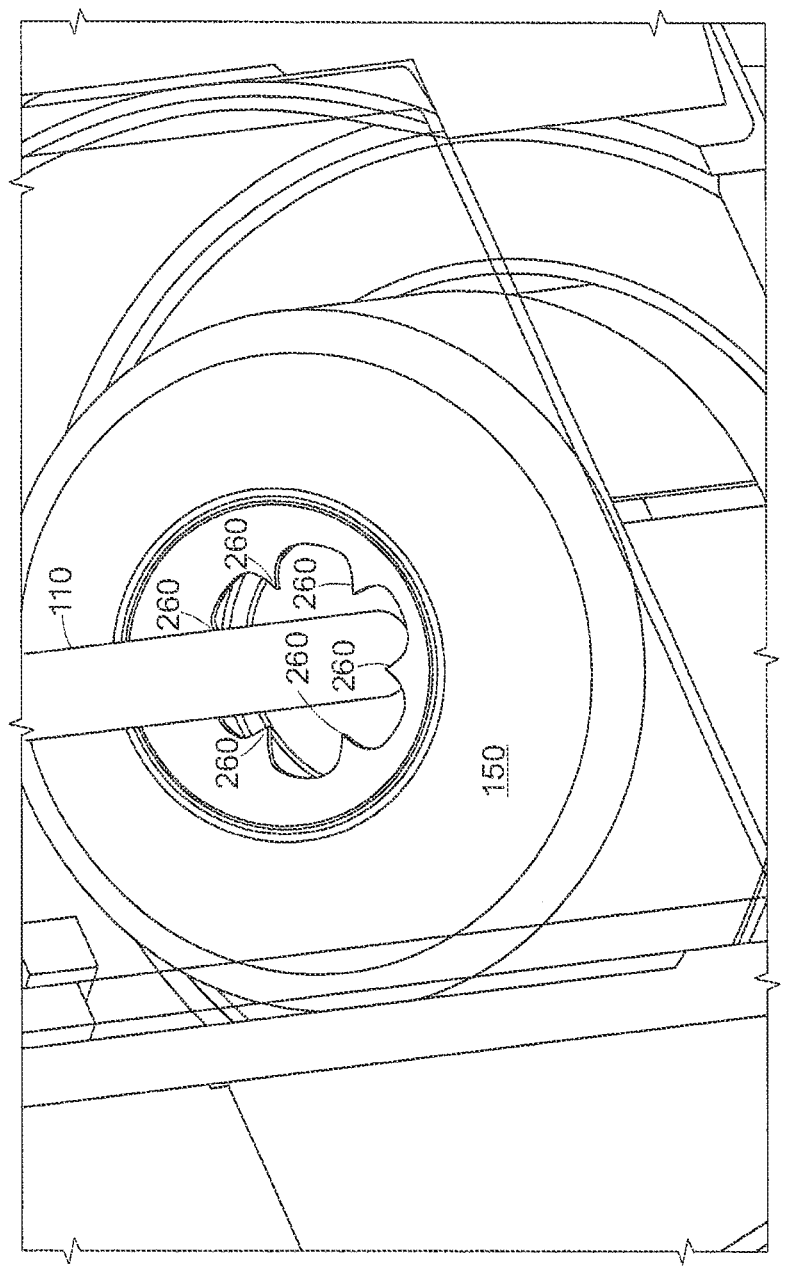

LATCH PLATE ASSEMBLY

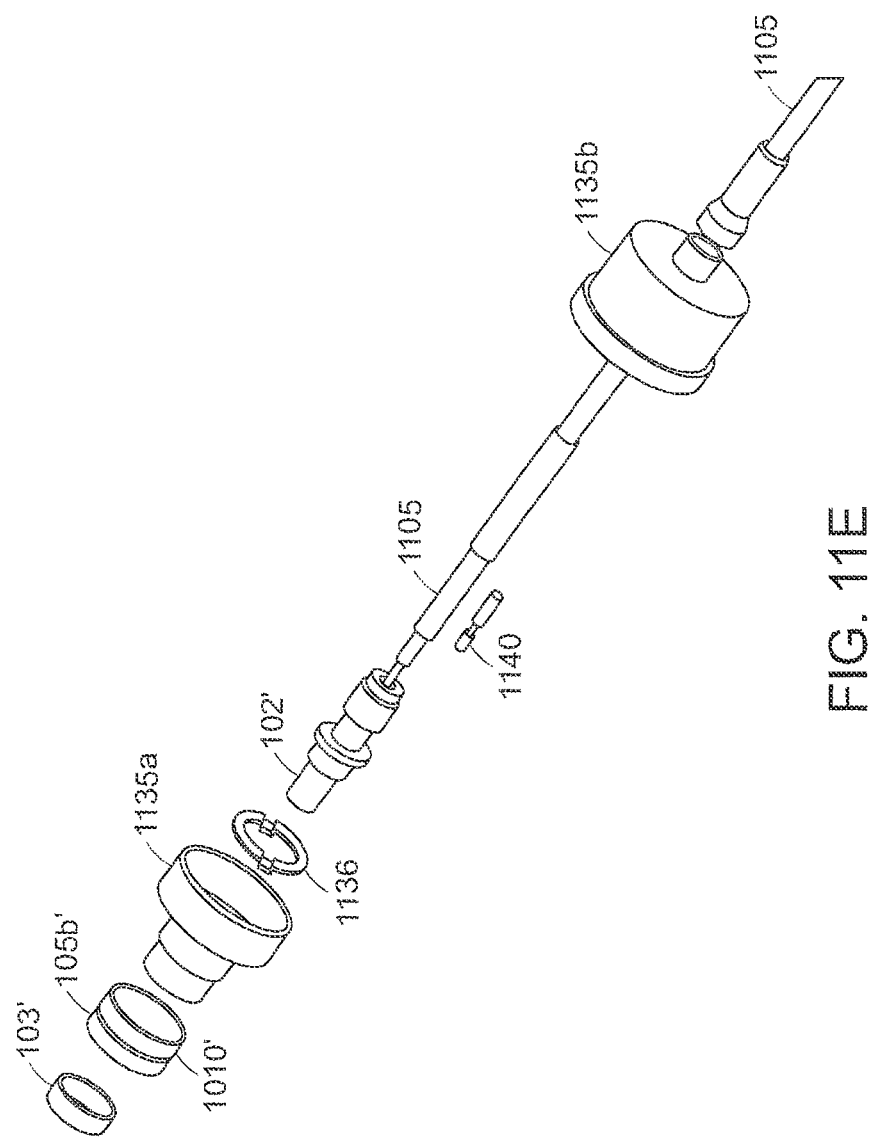

COLD CATHODE IONIZATION VACUUM GAUGE

RELATED APPLICATIONS

This application claims the benefit of U.S. Provisional Application No. 61/884,797, filed on Sep. 30, 2013. The entire teachings of the above application(s) are incorporated herein by reference.

BACKGROUND OF THE INVENTION

Cold cathode ionization vacuum gauges are well known. Three commonly known cold cathode ionization vacuum gauges include normal (noninverted) magnetron type gauges, inverted magnetron type gauges, and Philips (or Penning) gauges. All of these types of gauges have a pair of electrodes (i.e., an anode and a cathode) in an evacuated non-magnetic envelope which is connected to the vacuum to be measured. A high DC voltage potential difference is applied between the anode electrode and the cathode electrode to cause a discharge current to flow therebetween. A magnetic field is applied along the axis of the electrodes in order to help maintain the discharge current at an equilibrium value which is a function of pressure.

Accordingly, a cold cathode ionization vacuum gauge (CCIVG) provides an indirect measurement of vacuum system total pressure by first ionizing gas molecules and atoms inside its vacuum gauge envelope and then measuring the resulting ion current. The measured ion current is directly related to the gas density and gas total pressure inside the gauge envelope, i.e., as the pressure inside the vacuum system decreases, the measured ion current decreases. Gas specific calibration curves provide the ability to calculate total pressures based on ion current measurements.

A significant difference between a CCIVG and a hot cathode ionization vacuum gauge (HCIVG) is the lack of a hot filament to establish an ion current in a CCIVG. The lack of a hot filament simplifies the construction and operation of the CCIVG and improves its reliability, as there is no risk of filament burn-out by sudden or accidental exposure of the gauge to a high pressure. The lack of a hot filament, on the other hand, complicates gauge monitoring as there is no independent electron current to be measured and controlled, unlike in a HCIVG where the electron emission current is monitored and used to assure the validity of the ion current measurements. In other words, as the CCIVG starts to lose sensitivity, both the electron and ion currents decrease over time; however, since the user does not have direct access to electron current (in contrast to a hot cathode gauge), there is no way to know whether a drop in ion current is due to a reduction in electron current in the discharge or a reduction in process pressure.

In cold cathode ionization vacuum gauges of the inverted magnetron type, it is possible for a small leakage current to flow directly from the anode to the cathode via the internal surfaces of the gauge, and it is known that the presence of a so-called "guard ring" can collect this leakage current and thereby prevent it from reaching the cathode electrode and being detected by the gauge itself. To perform this function, the guard ring is electrically isolated from the cathode electrode and normally held at a small positive voltage potential difference relative to the cathode electrode.

Another aspect of cold cathode ionization vacuum gauges is that, as the pressure decreases, the gauge can take longer and longer times to start the discharge that is used to provide the ion current that is used to measure pressure. Many designs have been used to seed electrons into the discharge volume to trigger the avalanche process that is responsible for building up the discharge.

Nevertheless, there continues to be a need for improved cold cathode ionization vacuum gauges that minimize or eliminate the problems described above.

SUMMARY OF THE INVENTION

The invention is generally directed to a cold cathode ionization vacuum gauge and methods of operation thereof. The cold cathode ionization vacuum gauge includes an extended anode electrode and a cathode electrode surrounding the anode electrode along its length and forming a discharge space between the anode electrode and the cathode electrode. The vacuum gauge further includes an electrically conductive guard ring electrode interposed between the cathode electrode and the anode electrode about a base of the anode electrode to collect leakage electrical current, and a discharge starter device disposed over and electrically connected with the guard ring electrode, the starter device having a plurality of tips directed toward the anode and forming a gap between the tips and the anode. The plurality of tips can, for example, be numbered in a range of 2 tips to 8 tips, such as in a range of 5 tips to 7 tips, or 6 tips. The gap between the tips and the anode can be in a range of between about 500 µm and about 2500 µm. The starter device can be made of stainless steel, tungsten, or other metal or conductive material. The voltage potential difference between the starter device and the anode, during operation of the cold cathode ionization vacuum gauge, can be in a range of about 0.4 kilovolts (kV) to about 6 kV, such as about 3.5 kV. Optionally, the voltage potential difference between the starter device and the anode can be configured to be increased from about 3.5 kV to about 5 kV during startup of the gauge.

The cold cathode ionization vacuum gauge can include a removable anode sleeve. The removable anode sleeve can be a thin walled tube on the anode post that provides an electrical connection to the anode post and shields the anode post surface from contaminants. The anode sleeve may be held in place on the anode post with a friction fit. The cold cathode ionization vacuum gauge can also include a removable cathode.

The cathode electrode of the cold cathode ionization vacuum gauge can have an opening to receive gas from a monitored chamber, and the vacuum gauge can further include a baffle across the opening of the cathode to limit flow of sputtered material to the chamber. The baffle can be configured as a plurality of slots or holes disposed at an angle with respect to the anode. The angle can be in a range of about 0 degrees to about 60 degrees, such as about 45 degrees. Alternatively or additionally, the baffle can be composed of at least two partitions, each partition having at least one aperture, the apertures located out of a line of sight between the chamber and the cathode.

The cathode electrode of the cold cathode ionization vacuum gauge can have one end connected to a flange, and a magnetic coupler can be connected to the flange. A magnet assembly is configured to be slidably mounted over the cathode and magnetically coupled to the magnetic coupler.

The vacuum gauge can further include an electronics module configured to be directly coupled to the vacuum gauge with an interface complementary to the vacuum gauge, the module housing electronics adapted to operate and read the vacuum gauge. The electronics module can further include an interlock configured to lock to the vacuum gauge. The interlock of the electronics module can further include a gauge detector configured to detect the presence of the vacuum gauge and provide a corresponding gauge detect signal. The gauge detect signal can indicate whether or not the vacuum gauge is properly locked to the electronics module. In some aspects, the electronics module can further include a magnet on a front face of the electronics module adapted to hold the vacuum gauge in place until the interlock is engaged.

The vacuum gauge can further include a cable between the electronics module and the vacuum gauge with the vacuum gauge and electronics module displaced from each other, the cable having a first end and a second end, the first end being configured to imitate physical mating surfaces of the vacuum gauge to mate to the electronics module, and the second end being configured to imitate physical mating surfaces of the electronics module to mate to the vacuum gauge. The first end of the cable can comprise a central anode connection pin, an anode guard ring insulator spaced from and surrounding the anode connection pin and a guard ring connection surrounding and spaced from the anode guard ring insulator. The first end can further comprise an outer cylindrical insert having an interlock groove. The second end of the cable can comprise a central anode connection sleeve, a guard ring insulator mating sleeve and a guard ring mating sleeve. The interlock of the electronics module can further include a gauge detector configured to detect the presence of the vacuum gauge or the first end of the cable.

Methods of operating a cold cathode ionization vacuum gauge include setting a voltage potential difference to form an electrical discharge between the anode electrode and the cathode electrode, measuring a discharge impedance between the anode electrode and the cathode electrode, and deriving a pressure reading therefrom. A method includes switching the voltage potential difference between a high voltage setting and a low voltage setting. The switch is made at a pressure that is lower than that of a high voltage measurement anomaly and at a pressure that is higher than that of a low voltage measurement anomaly. The high voltage measurement anomaly and the low voltage measurement anomaly can be discharge current anomalies. The high voltage setting can be in a range of about 3.5 kV to about 6 kV, and the low voltage setting can be in a range of about 2 kV to about 3 kV.

Another method of operating a cold cathode ionization vacuum gauge includes measuring a leakage electrical current between an electrically conductive guard ring electrode interposed between the cathode electrode and the anode electrode about a base of the anode electrode, and triggering a gauge maintenance alarm if the pressure reading is less than an oscillatory discharge current pressure level and the leakage electrical current is greater than a maximum allowable leakage current limit. The oscillatory discharge current pressure level can be about $5 \times 10^{-6}$ Torr. The maximum allowable leakage current limit can be about 1 μA.

Yet another method includes measuring a discharge current between the anode electrode and the cathode electrode, and deriving a pressure reading therefrom, recording the discharge current as a function of time, and integrating the discharge current over time to obtain a pressure dose for the vacuum gauge. The method can further include recording and integrating a gas factor and/or an ion energy factor as a function of time. Additionally, the method can include determining a remaining service life for the vacuum gauge based on the pressure dose.

This invention has many advantages, including long term stability due to separate measurement of discharge current and leakage current, reproducible and rapid startup due to the starter device, and avoidance of measurement anomalies during operation of the cold cathode ionization vacuum gauge.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 2C is a bottom view of the starter device for a cold cathode ionization vacuum gauge.

FIG. 11E is an exploded view of the component parts of the cable end shown in FIG. 11D.

DETAILED DESCRIPTION OF THE INVENTION

A description of example embodiments of the invention follows.

The cold cathode ionization vacuum gauge described herein relies on the inverted magnetron principle. The gauge is of cylindrical symmetry. A large voltage potential difference (i.e., radial electric field) between the anode pin (located at the axis) and the cathode cylindrical envelope provides energy to the electrons for the ionization events to occur. A crossed axial magnetic field provides the electron trajectory path length required to maintain a discharge inside the envelope. The discharge current is the measured quantity that is proportional to the pressure in the system.

The discharge is established through an avalanche ionization process that generally starts with a single electron being released into the ionization volume of the gauge. The process responsible for releasing an electron can include a field emission event or a cosmic ray ionization process. The avalanche process relies on the long path length for the electron trajectories that leads to many ionization processes per electron. Each ionization process releases an ion as well as an additional electron that is added into the discharge. As the ions collide with the cathode internal walls, additional electrons are also released into the discharge, thereby contributing to the total charge. The electrical discharge consisting of ions and electrons reaches an ion density that is proportional to the pressure in the system.

The cold cathode ionization vacuum gauge described herein relies on the double inverted magnetron principle introduced by Drubetsky in 1995. See U.S. Pat. No. 5,568, 053. The double inverted magnetron design, shown in FIG. 1A, includes two magnets held together in a magnet assembly, the two magnets having their magnetic poles opposed to one another. The double inverted magnetron features some of the largest magnetic fields, and, as a result, provides the largest gauge sensitivities available. Large gauge sensitivities are required to be able to read reliable pressures at UHV levels (i.e., pressures less than about $10^{-9}$ Torr).

Figure 1A:
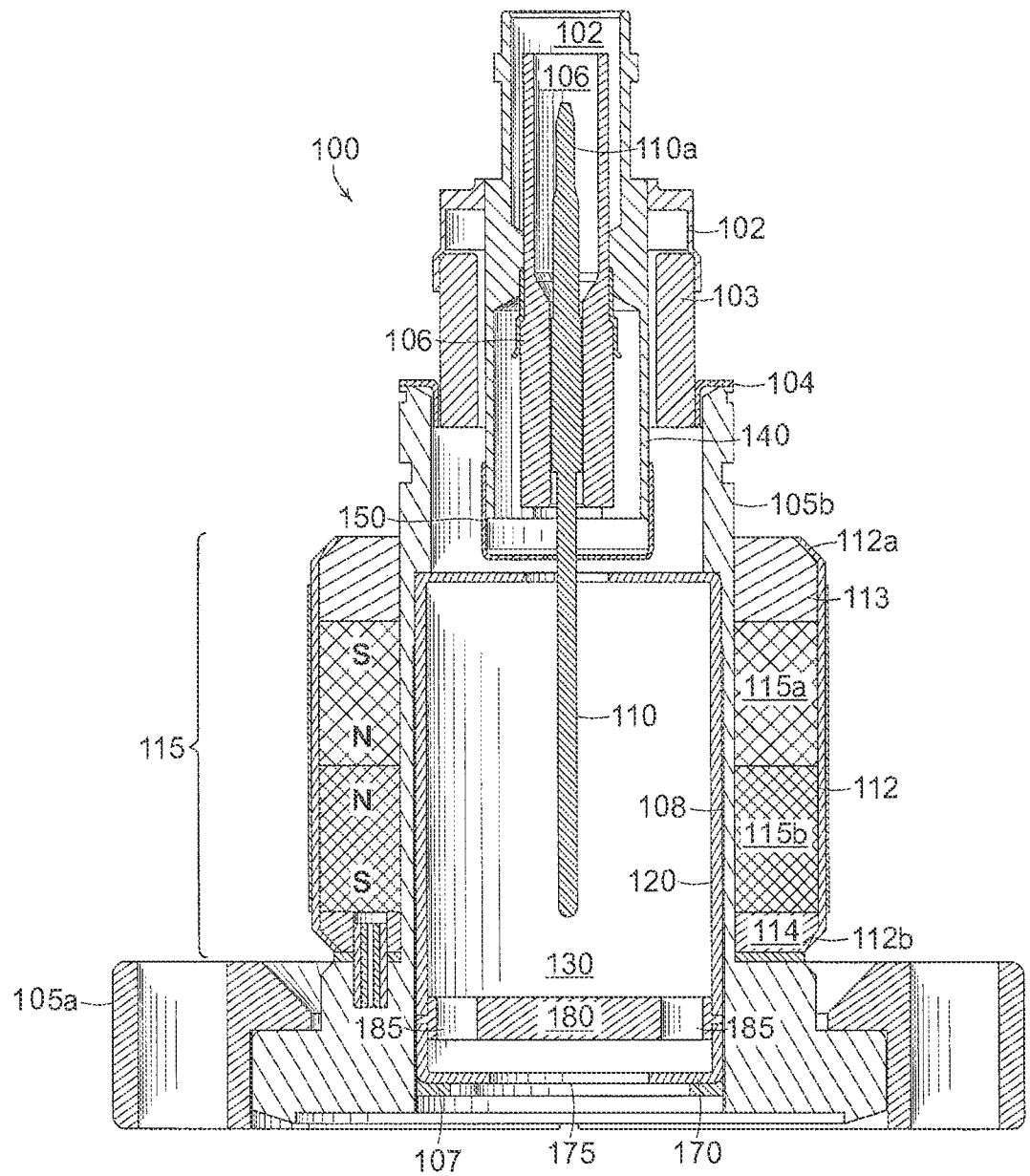
FIG. 1A is a cross-sectional illustration of a cold cathode ionization vacuum gauge.
Figure 1B:
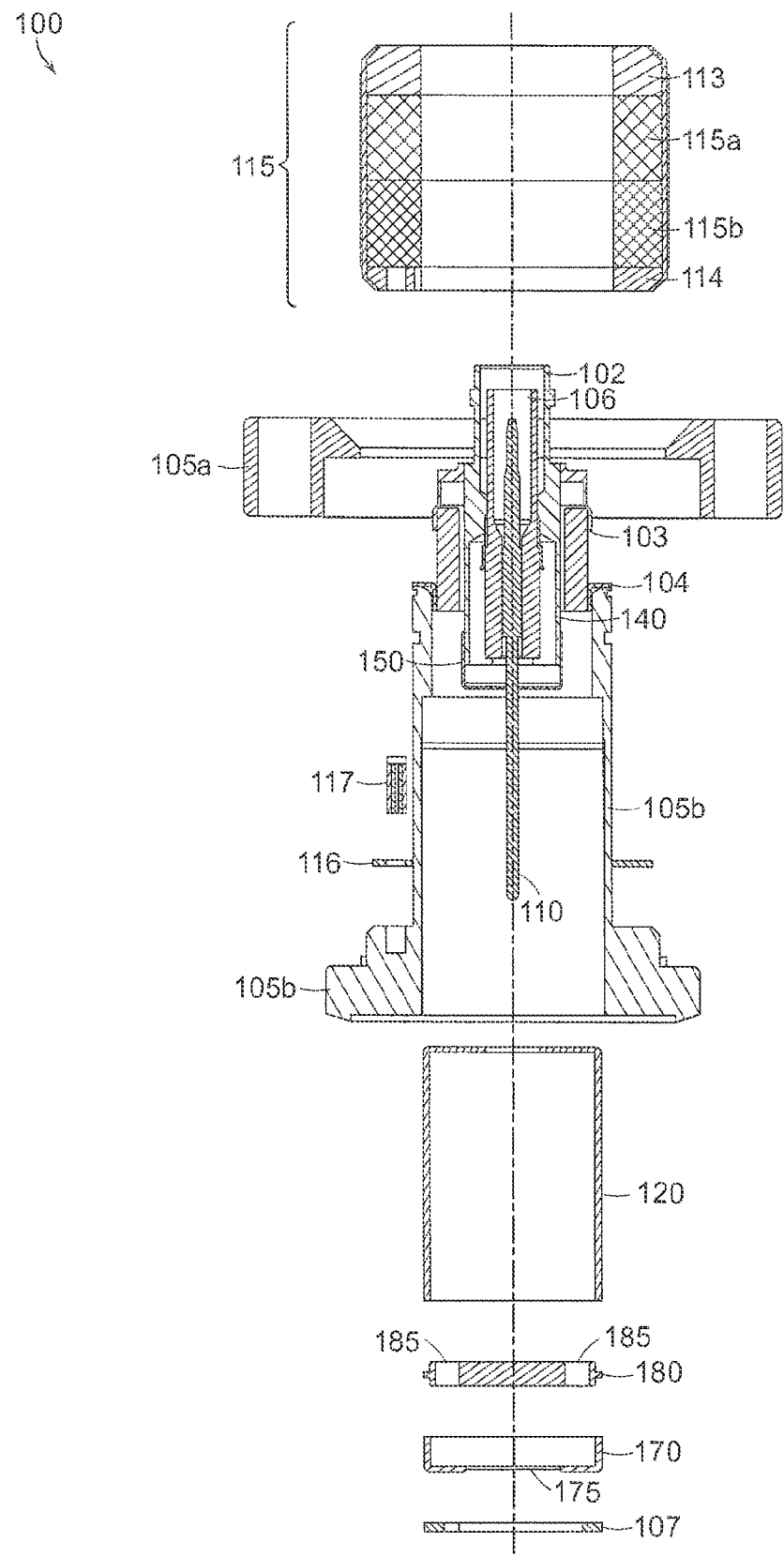
FIG. 1B is an exploded cross-sectional view of the component parts of a cold cathode ionization vacuum gauge.
Figure 1C:
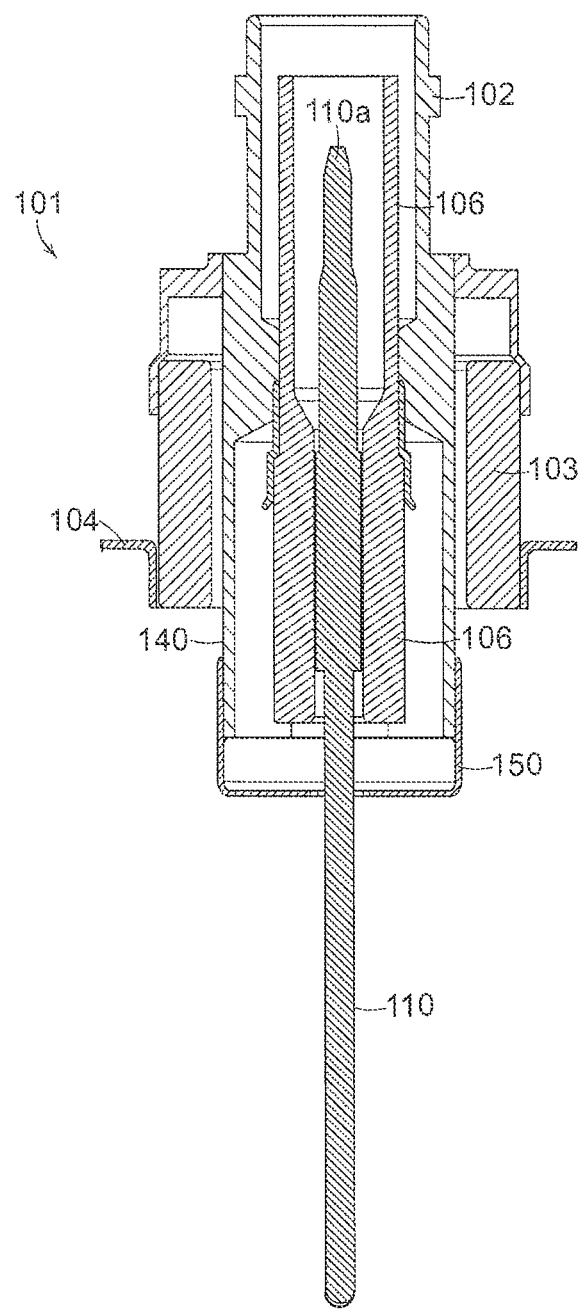
FIG. 1C is a cross-sectional view of the component parts of a SHV feedthrough of a cold cathode ionization vacuum gauge.
Figure 1D:
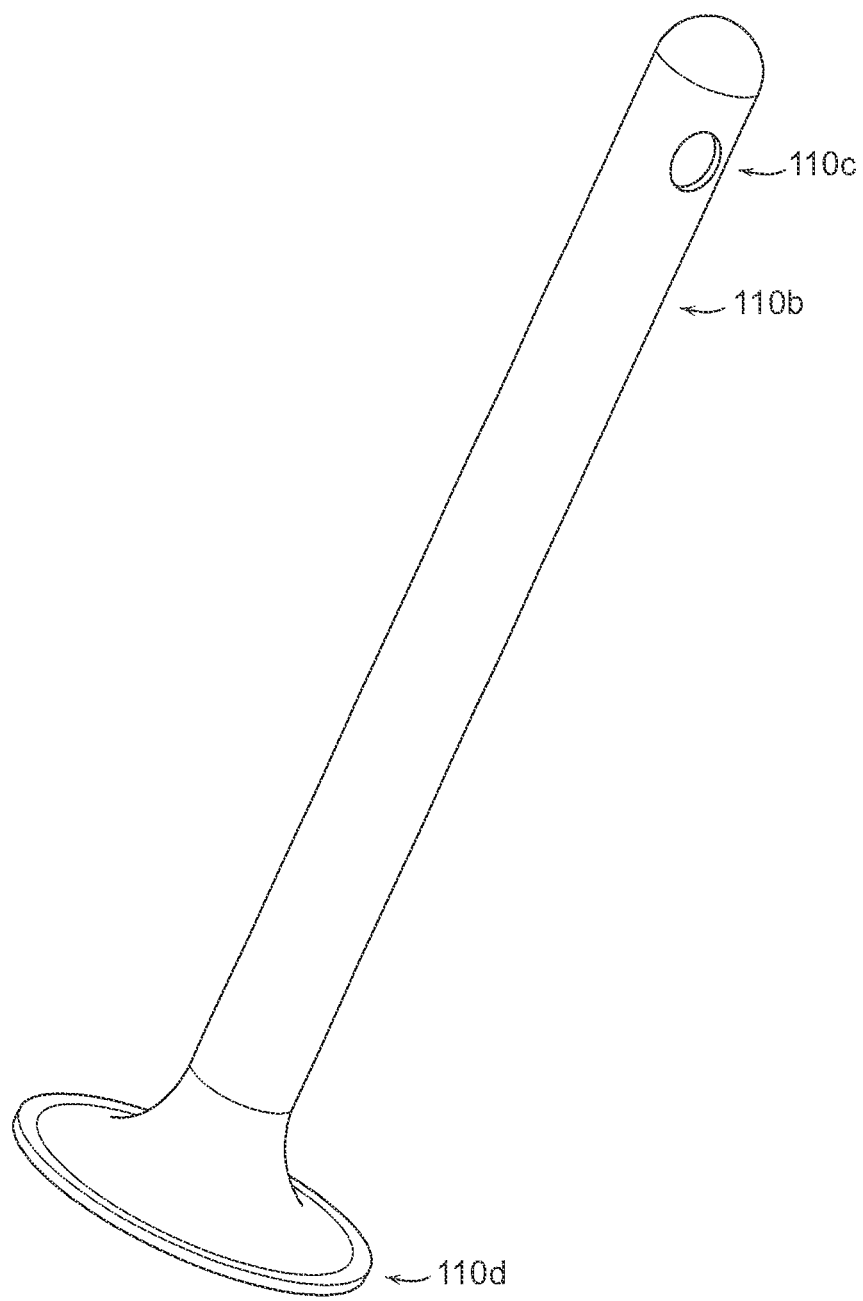
FIG. 1D is an illustration of an optional anode sleeve.
Figure 1E:
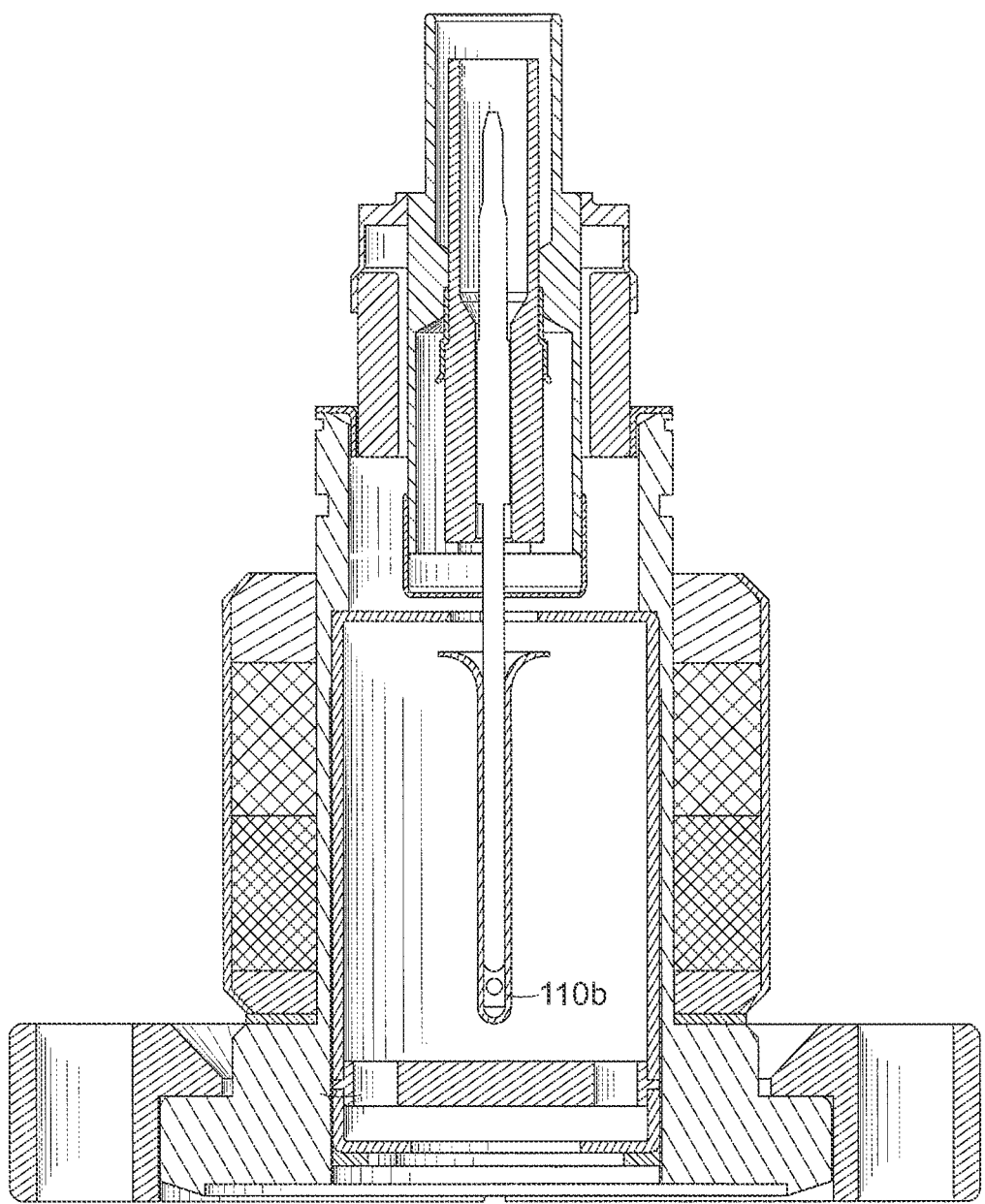
FIG. 1E is a cross-sectional illustration of a cold cathode ionization vacuum gauge with an optional anode sleeve.
Figure 1F:
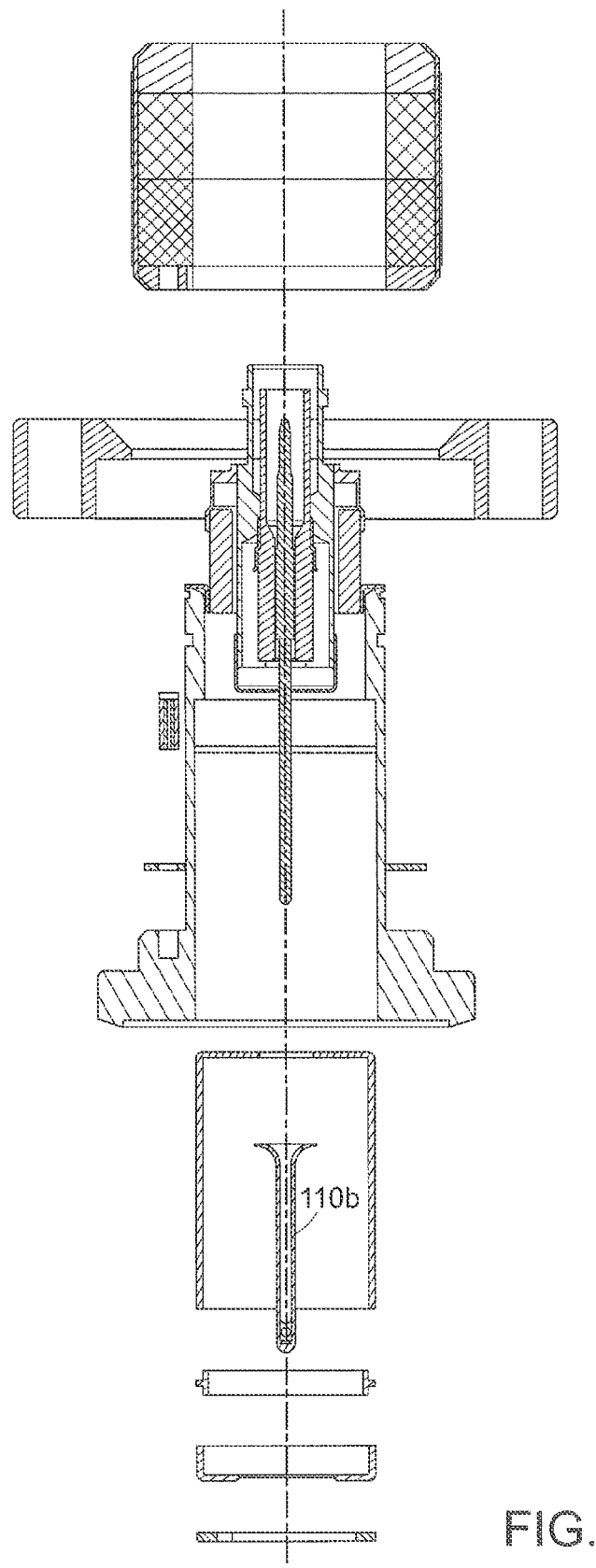
FIG. 1F is an exploded cross-sectional view of the component parts of a cold cathode ionization vacuum gauge with an optional anode sleeve.

Accordingly, in one aspect, shown in FIGS. 1A, 1B, and 1C, a cold cathode ionization vacuum gauge 100 includes a floating SHV (safe high voltage) stainless steel cylindrically symmetric feedthrough 101, shown in FIG. 1C separately from the rest of the vacuum gauge 100, that includes a guard ring BNC style connection 102 that provides electrical connection to a guard ring electrode 140 described below. Inside the guard ring connection 102, an anode guard ring insulator 106 provides electrical insulation around an anode connection 110a to an extended anode electrode 110. The guard ring electrode 140 is connected to a starter device 150, which is described below. The guard ring connection 102 is connected by a cathode-guard ring insulator 103 to a weld surface 104, which is seam welded to a monolithic flange assembly 105. As shown in FIGS. 1A and 1B, the monolithic flange assembly 105 includes outer flange 105a and inner flange 105b. The inner flange 105b encloses a cathode electrode 120 surrounding the anode electrode 110 along its length and forming a discharge space 130 between the anode electrode 110 and the cathode electrode 120. A baffle, described below and shown in FIGS. 1A and 1B as two partitions 170 and 180 having apertures 175 and 185, respectively, is connected to the cathode electrode 120. As shown in FIG. 1B, the cathode electrode 120 and baffle partitions 170 and 180 are removable from inner flange 105b, enabling refurbishing of the vacuum gauge 100. The cathode electrode 120 and baffle partitions 170 and 180 are retained inside inner flange 105b by a snap ring 107. A refurbishing kit for vacuum gauge 100 can include a replacement cathode 120 and baffle partitions 170 and 180, and, optionally, an anode sleeve 110b, shown in FIGS. 1D, 1E and 1F, that covers the surface of anode electrode 110, thereby replacing or covering the surfaces that are subject to sputtering or deposition during operation of the vacuum gauge 100. To aid in evacuation of the vacuum gauge 100 after replacement of the cathode 120, a small gap 108, shown in FIG. 1A, is provided between the cathode 120 and the inner flange 105b. The gap 108 terminates at the end of the cathode 120 close to the guard ring electrode 140, in order to provide proper alignment of the cathode 120 with the guard electrode 140 and anode electrode 110.

The removable and replaceable anode sleeve 110b may be a thin walled tube that slides onto the anode post 110, providing electrical connection to the anode post and shielding the post surface from contamination build-up. The anode sleeve 110b may simply be held in place with a friction fit. The anode sleeve 110b may also include a hole 110c on the top end that can be used to hook the sleeve in order to pull it out of the gauge structure. The bottom end of the anode sleeve 110b may include a flare 110d. The anode sleeve flare 110d can inhibit deposits from falling into the starter device 150.

Once a gauge shows signs of contamination, it should be possible to quickly and easily clean the contaminated areas of the gauge and restore it to a fully functional condition. The anode in a CCIVG is expected to build a layer of hydrocarbon or silicone contaminants very quickly in a vacuum system. A removable anode sleeve 110b can be used in CCIVGs to protect and shield the anode post from contamination build up during the operation of the gauge. Used in combination with the removable cathode 120, it provides a fast and easy method of field servicing a CCIVG and a CCIVG user is able to restore the entire gauge in a matter of a few minutes. This method of servicing a CCIVG has several advantages over previous methods. Using a removable and replaceable anode sleeve 110b and cathode eliminates the need to use abrasive materials to clean the anode post and cathode once they are contaminated. Abrasive cleaners may abrade away too much material from the internal surfaces of the gauge and significantly impact their mechanical and chemical characteristics. With a removable sleeve and cathode, the contaminated surfaces can be easily removed and replaced with a clean set. The contaminated cathode cage and the anode sleeve do not have to be cleaned by means of abrasive treatments. In most cases, the cleaning can be done in an ultrasonic cleaner with the help of proper chemicals. One way to eliminate hydrocarbon build up on the anode post is to use alkaline cleaners such as a concentrated solution of NaOH followed by a rinsable cleaning solution. Using a removable anode sleeve and cathode reduces the possibility of affecting the concentric alignment between the anode and the cathode because the gauge does not need to be fully disassembled. The maintenance cost is minimal. A user with access to an extra anode sleeve/cathode combination can quickly do a swap each time maintenance is required.

As discussed above, a crossed axial magnetic field provides the electron trajectory path length required to maintain a discharge inside the discharge space 130. The magnetic field is created by magnet assembly 115, shown in FIGS. 1A and 1B, which includes two Samarium Cobalt (SmCo) magnets 115a and 115b that are glued together one on top of the other with their magnetic poles opposite to one another in a double inverted (DI) configuration, and enclosed by a stainless steel cylinder 112 whose ends 112a and 112b are swaged closed, thereby confining the magnets 115a and 115b, which would otherwise repel each other due to the opposite pole configuration. The magnet assembly 115 includes a ferromagnetic spacer 114, which connects the magnet assembly 115 to the inner flange 105b by the aid of a locating pin 117 pressed into the inner flange 105b, and a magnetic coupler 116 (shown as a ferromagnetic ring 116 in FIG. 1B). The magnetic coupler 116 is spot welded to the inner flange 105b. The magnet assembly 115 is slidably connected to the inner flange 105b at a location with respect to cathode electrode 120 that locates the electrical discharge inside discharge space 130. The magnet assembly 115 can also include an aluminum (or other non-magnetic material) spacer 113 at the end of the magnet assembly closest to the guard ring 140 to adjust the location of the electrical discharge away from the guard ring 140.

The electrically conductive guard ring electrode 140 is interposed between the cathode electrode 120 and the anode electrode 110 about a base of the anode electrode 110 to collect leakage electrical current that would otherwise tend to flow between the anode electrode 110 and the cathode electrode 120 if electrically conductive deposits accumulate over time on surfaces of the cathode-guard ring insulator 103 exposed to the discharge space 130 during operation of the vacuum gauge 100.

Figure 2A:
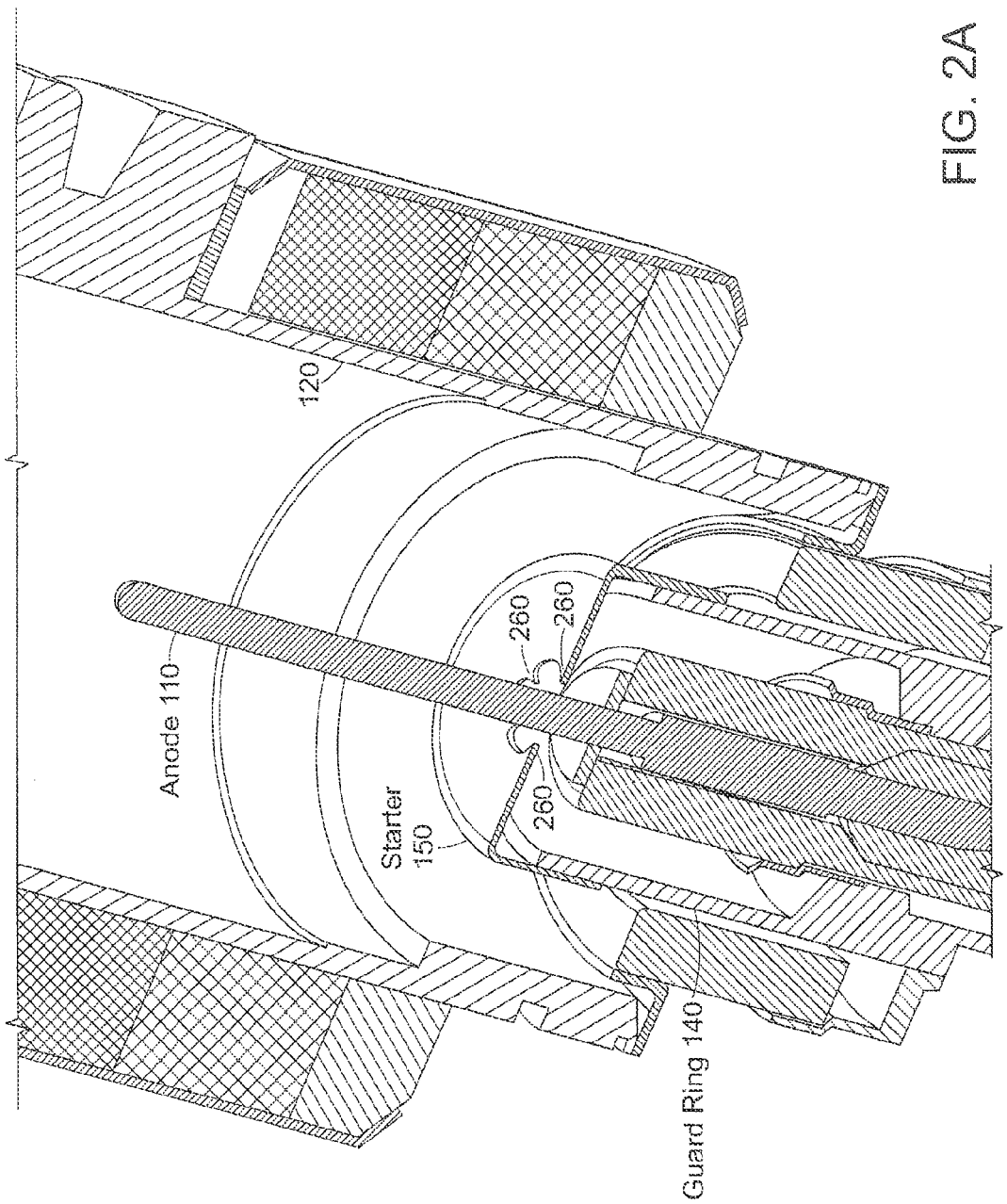
FIG. 2A is a cross-sectional perspective view of the starter device for a cold cathode ionization vacuum gauge.
Figure 2B:
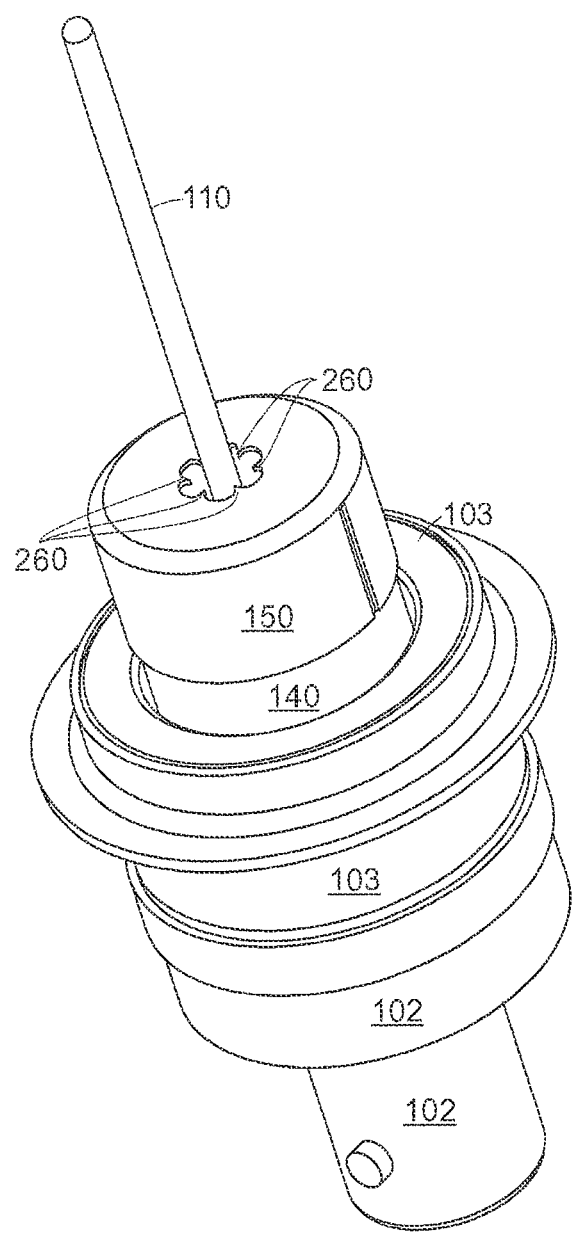
FIG. 2B is a perspective view of the starter device for a cold cathode ionization vacuum gauge.

A discharge starter device 150 is disposed over and electrically connected with the guard ring electrode 140. As shown in FIG. 2A, the starter device 150 has a plurality of tips 260 (3 tips are shown in the cross-section cylindrically symmetrical view shown in FIG. 2A) directed toward the anode 110 and forming a gap between the tips 260 and the anode 110. The plurality of tips 260 can be numbered in a range of 2 tips to 8 tips, such as in a range of 5 tips to 7 tips, or 6 tips, as shown in FIG. 2C, where another view of starter device 150 shows 6 tips 260, of which one tip 260 is hidden behind anode electrode 110. The tips can be designed in various patterns, such as star bursts. See U.S. Pat. No. 8,120,366 for examples of starter tip shapes. The gap between the tips and the anode can be in a range of between about 500 μm and about 2500 μm. The gap is configured such that the field emission current during normal operation is in a range of about 1 pA to about 10 pA when a voltage potential difference between the starter device 150 and the anode 110 is established. The field emission current amplitude is dependent on several parameters, such as the voltage potential difference, the size of the gap, the number of points on the starter device, and the type of material that the starter device is made of. The starter device 150 can be made of stainless steel, tungsten, or other metal or conductive material. The voltage potential difference between the starter device and the anode, during operation of the cold cathode ionization vacuum gauge, can be in a range of about 0.4 kV to about 6 kV, such as about 3.5 kV. This voltage potential difference produces electrons by field emission from the sharp tips 260 to the anode, thereby seeding some electrons into the discharge volume 130 to trigger the avalanche process that is responsible for building up the discharge. Optionally, the voltage potential difference between the starter device and the anode can be configured to be increased from about 3.5 kV to about 5 kV during startup of the gauge, in order to increase the field emission current by increasing the high voltage supply bias to the anode electrode momentarily, until a discharge is detected by a sudden increase in the discharge current.

Figure 3:
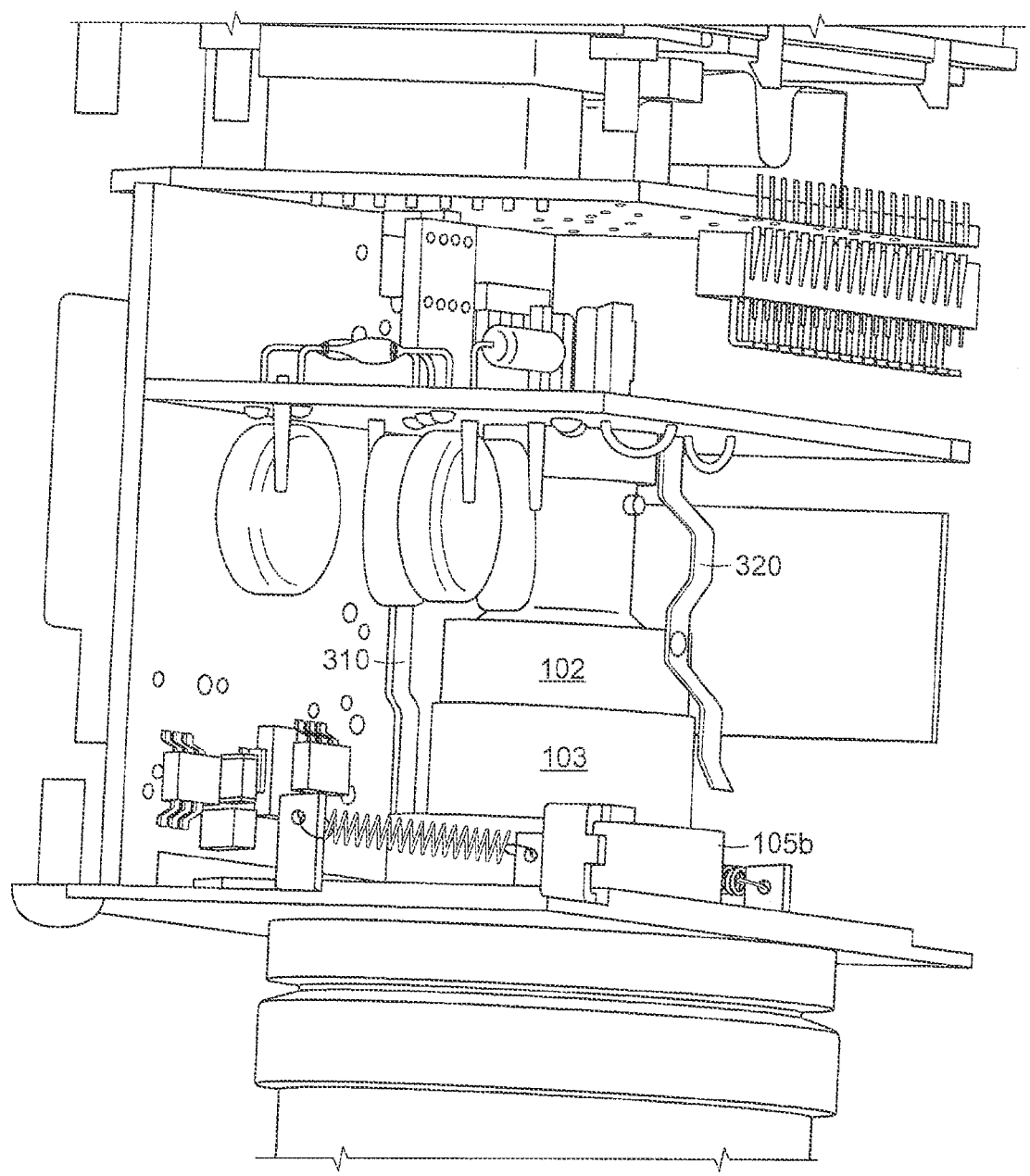
FIG. 3 is a perspective view of electrical contacts to a vacuum gauge inside an electronics module for a cold cathode ionization vacuum gauge.

During operation of the vacuum gauge 100, electrical contacts to the anode electrode 110 and guard ring electrode 140 are made by the anode connection 110a and the guard ring connection 102, respectively. Electrical contact to the cathode electrode 120, which is grounded, is made either by a spring clip 310 shown in FIG. 3, which is located inside an electronics module described below, the spring clip 310 contacting the inner flange 105b, or by a wire attached to a cable, as described below, the wire being attached to any part of the outer flange 105a (e.g., attached to a bolt that fastens the outer flange 105a to a vacuum chamber (not shown)). As also shown in FIG. 3, contact to the guard ring connection 102 inside the electronics module is made by another spring clip 320.

Figure 4:
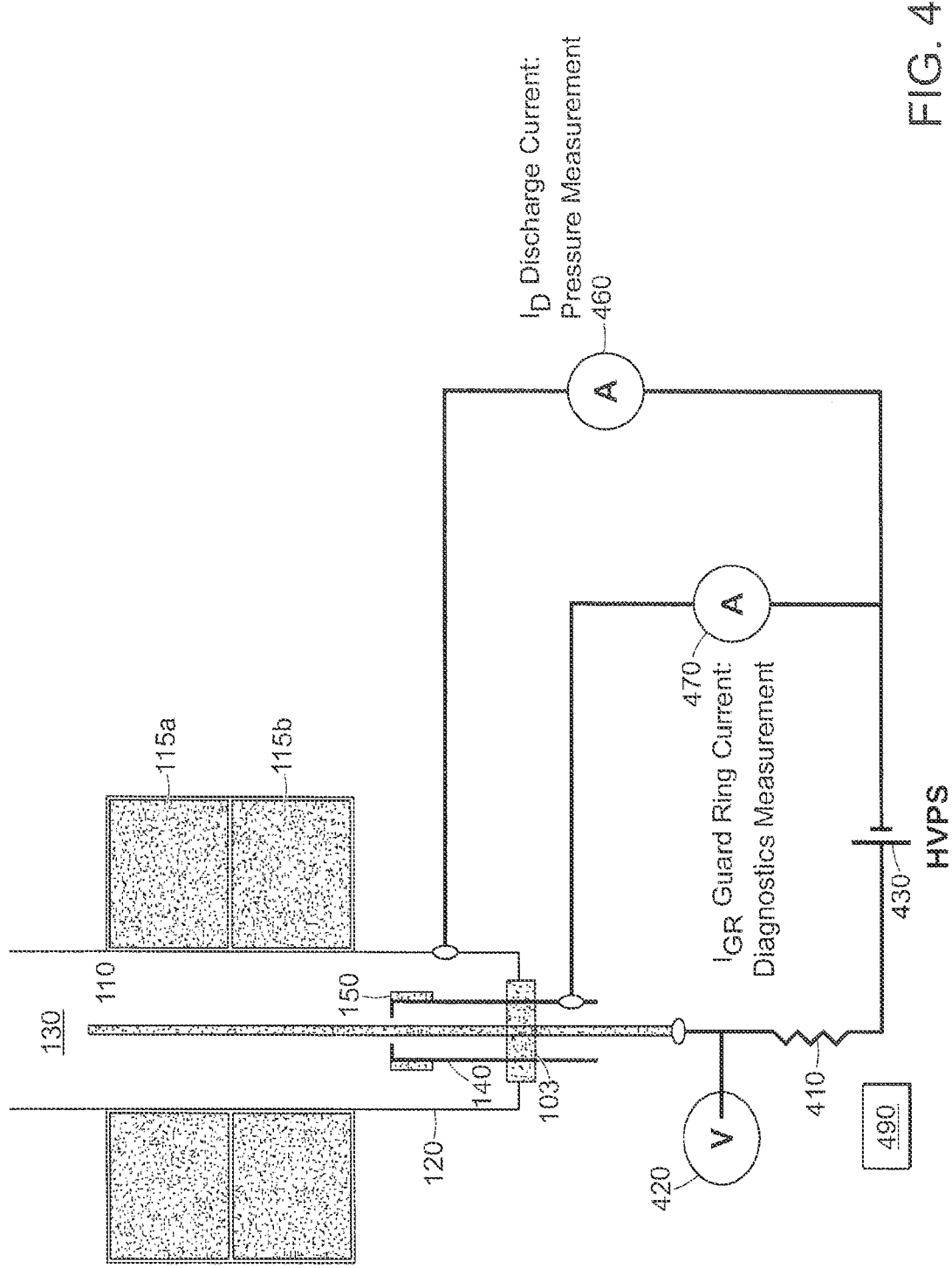
FIG. 4 is a schematic illustration of the discharge current and guard ring leakage current measurement circuits of a cold cathode ionization vacuum gauge.
Figure 5:
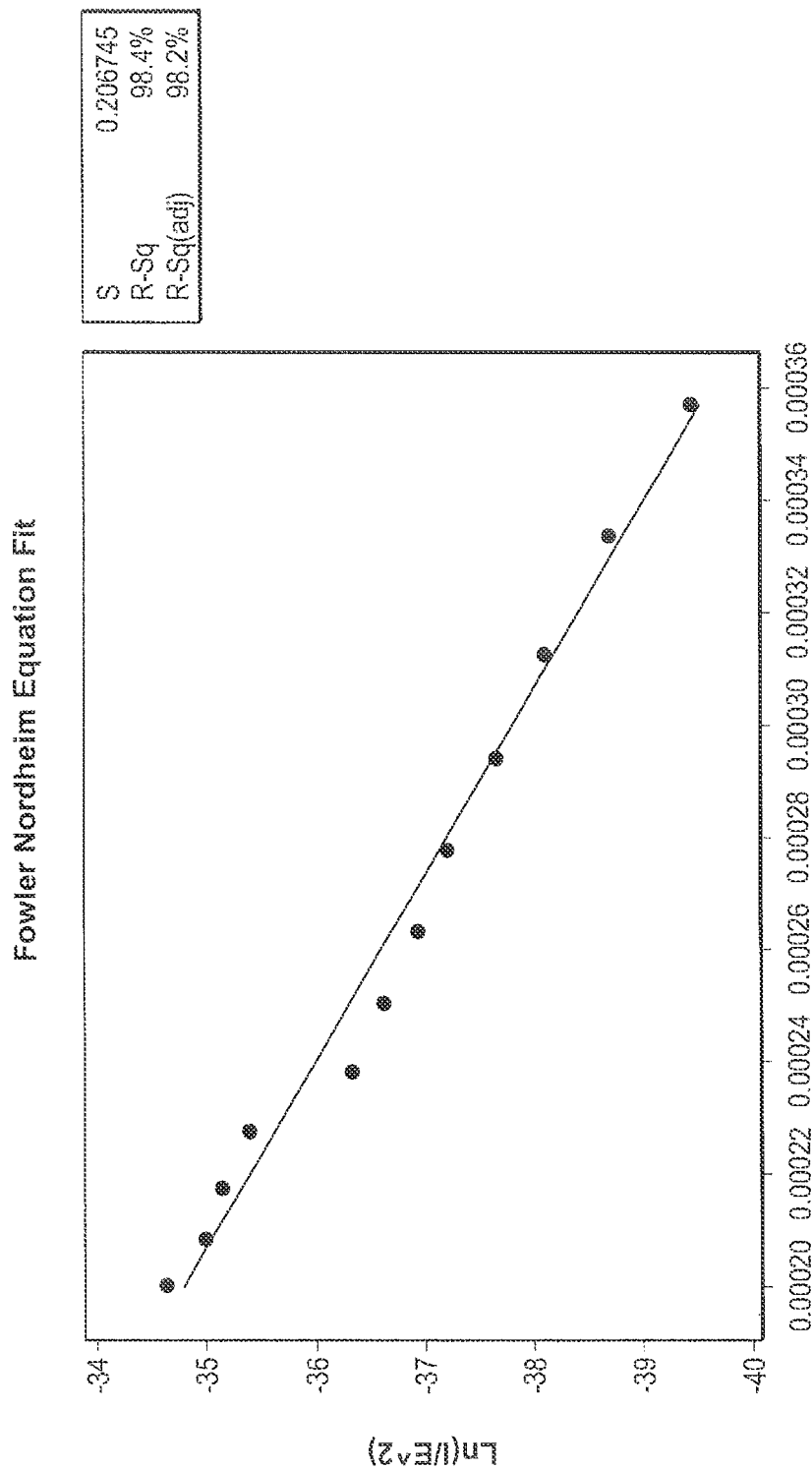
FIG. 5 is a graph of $\ln(I/E^2)$ as a function of $1/E$ demonstrating the fit of the data for a cold cathode ionization vacuum gauge to the Fowler Nordheim equation.

As shown in FIG. 4, an advantage of having the starter device 150 disposed over and electrically connected to the guard ring 140 is that the guard ring current $I_{GR}$, which is the sum of the leakage current $I_L$ and the field emission current $I_{FE}$ ($I_{GR}=I_L+I_{FE}$), is measured by ammeter 470 separately from the discharge current $I_D$, which is measured by ammeter 460, from which the pressure is derived by a suitable calibration curve. The field emission current $I_{FE}$ can be calculated using the Fowler Nordheim equation $$I_{FE} = \frac{1.54 \times 10^6 A(\beta E)^2}{\varphi} e^{\left(-\frac{6.83 \times 10^3 \varphi^{3/2}}{\beta E}\right)} \quad (1)$$

where E is the electric field (MV/m), Φ is the work function of the material (eV), β is the field enhancement factor, and A is the effective emitting area (m²). As shown in FIG. 5, the graph of leakage current as a function of electric field shows a good fit to Eq. 1 and therefore demonstrates that there is field emission current from the guard ring starter device to the anode.

Since the start times of a cold cathode ionization vacuum gauge are of a statistical nature, meaning that under the same conditions different start times will be measured each time, if enough samples are measured, a distribution of start times is generated. While it is difficult to specify a start time from a histogram of start times, if a cumulative probability is used, which is the normalized integral of the starting time histogram, the starting probability can be predicted at any time and voltage at a given pressure. Starting times are measured by turning off all sources of ions in a vacuum chamber; after a waiting period, the high voltage power supply (HVPS) 430 to the gauge is turned on, and both the cathode discharge current $I_D$ and the guard ring current $I_{GR}$ are measured; when the cathode current jumps from its nominal baseline of 10ths of nanoamperes to operational values several decades larger, the start time is logged. The system is automated to repeat this collection method, so that start time statistics can be accumulated.

Figure 6:
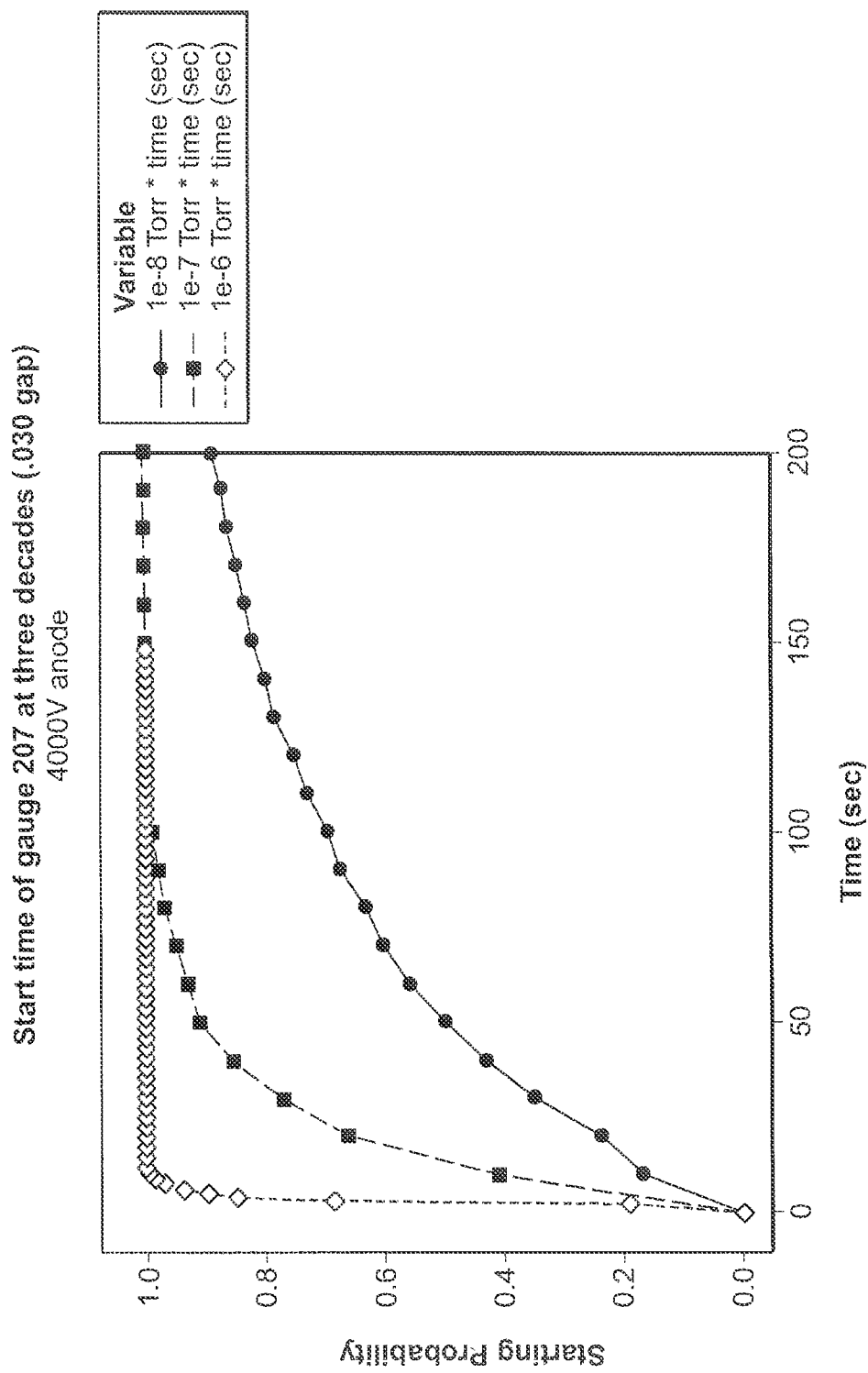
FIG. 6 is a graph of the starting probability as a function of time at three different pressures for a cold cathode ionization vacuum gauge.

FIG. 6 shows the starting probability curve for a cold cathode ionization vacuum gauge at three different pressures, showing the effect of system pressure on start time for a cold cathode ionization vacuum gauge having a gap of about 762 µm (0.030″) in the starter device and a 4 kVolt voltage potential difference between the anode electrode and the cathode electrode. Using this data, it can be said that at $1\times10^{-8}$ Torr there is a 60% chance of starting in 100 seconds, and at $1\times10^{-6}$ Torr the vacuum gauge will always start in less than 20 seconds. Equation 1 shows that the field emission current increases as the work function decreases. A starter device made of stainless steel alloy has a work function of about 4.4 eV. A metal with a lower work function would help decrease start time by increasing the field emission current, while a metal with a higher work function could be used to reduce the emission current and hence reduce the starting time of the CCIVGs. Variations in starter designs include varying not only the actual mechanical design, but also the material used. It is expected that varying the material will vary the work function and also change the field emission levels. Starting time optimization includes using the statistical plots described here for metrics of improvements, and adjusting the starter parameters including the number and shape of field emitting points, the gaps between anode and field emitting points (this could include not only changing the starter design, but also using sleeves of different wall thicknesses and materials in the anode to carefully adjust gaps), the voltage potential difference between the anode electrode and the starter device, and the material of construction of the starter device.

Figure 7A:
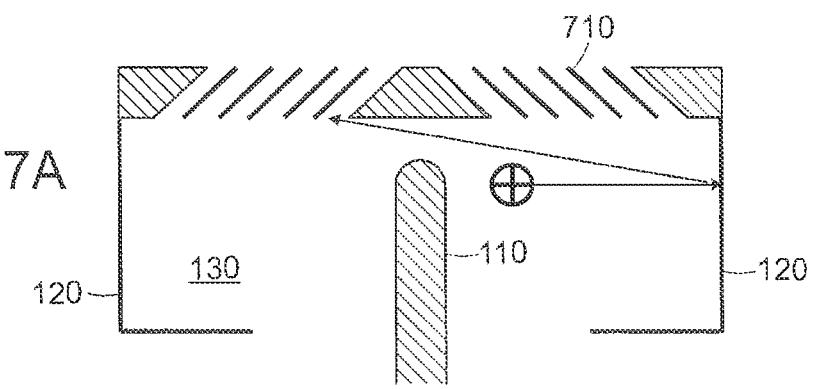
FIGS. 7A-7C are cross-sectional illustrations of three baffle designs for a cold cathode ionization vacuum gauge.
Figure 7B:
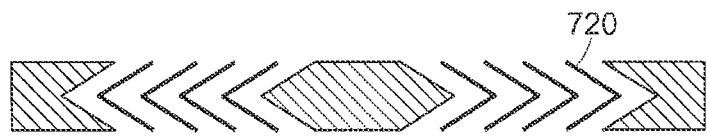
Figure 7C:
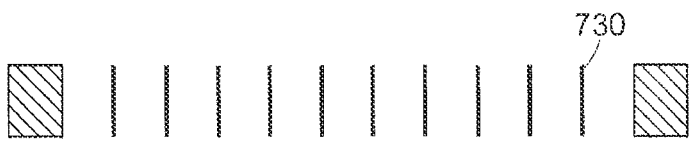
Figure 8:
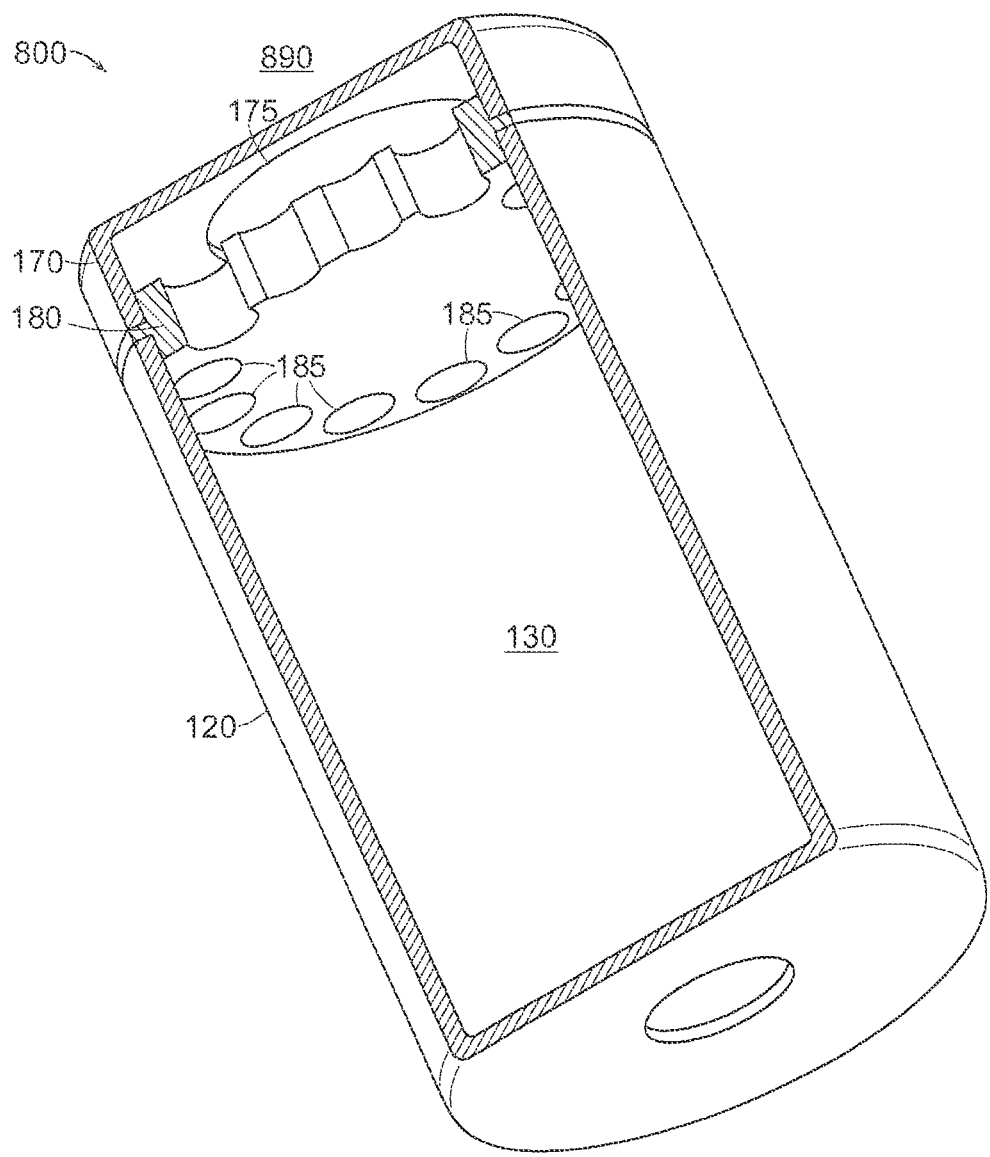
FIG. 8 is a cross-sectional perspective illustration of a baffle design having two partitions for a cold cathode ionization vacuum gauge.

Turning to FIGS. 7A-7C and 8, the cathode electrode of the cold cathode ionization vacuum gauge can have an opening to receive gas from a monitored chamber, and the vacuum gauge can further include a baffle across the opening of the cathode to limit flow of sputtered material to the chamber. The sputtered material results from erosion of the material of the cathode 120 by energetic impact between positive ions in the discharge volume 130 and the internal surface of the cathode 120, as shown in FIG. 7A. The baffle can be configured as a plurality of slots 710, chevrons 720, or holes 730 disposed at an angle with respect to the anode 110, as shown in FIGS. 7A-7C, respectively. The angle can be in a range of about 0 degrees, as shown in FIG. 7C, to about 60 degrees, such as about 45 degrees, as shown in FIG. 7A. Alternatively or additionally, the baffle 800 can be composed, as shown in FIG. 8, of at least two partitions 170 and 180, each partition having at least one aperture 175 in partition 170, and at least one aperture 185 (shown as a plurality of holes 185 in FIG. 8) in partition 180, the apertures of the partitions located out of a line of sight between a chamber 890 (not shown in detail) and the discharge volume 130. The partition 170 facing the chamber 890 allows gas to flow in and out through apertures (e.g., holes or slots) without substantially limiting gas conductance, provides an upper electrical boundary condition for the electric field, and provides shielding against the escape of sputtered material out of the cathode 120. The designs shown in FIGS. 7A-7C and 8 take advantage of the directionality of ejected sputtered materials to reduce the escape of sputtered material while still supporting high gas conductance. These designs can be considered to be baffles designed to stop material from escaping the CCIVG ionization area, but can also be considered baffles to stop materials coming from the process chamber into the ionization region 130. The common feature of these designs is a short profile with high gas conductivity and blind to line of sight contaminants. In that respect, these baffles are not limited to cold cathode ionization vacuum gauges, and can be used in a variety of vacuum gauge designs.

Cold cathode ionization vacuum gauges presently available commercially typically have 1) a gauge connected to a controller through a cable interconnect, or 2) a gauge connected directly to an electronics module, i.e. with no cable interconnect. The choice between the two technologies seems to be defined by (1) the need to bake out the gauge while the gauge is operating and (2) a need to operate the electronics remotely from the gauge. Most modular CCIVGs require a direct connection between the gauge and the module, and tools are often required to separate the gauge from the controller. In some cases the magnet assembly is part of the electronics module, and in some other cases the magnets are part of the gauge which might require an additional tool to separate them from the gauge tube. CCIVGs with modular configurations generally include o-ring or compressed glass fittings and generally do not allow extensive and/or high temperature bakeouts. The lack of flexibility of modular designs limits their applicability and drives many users to more complicated and costlier products that include remote controllers.

Figure 9A:
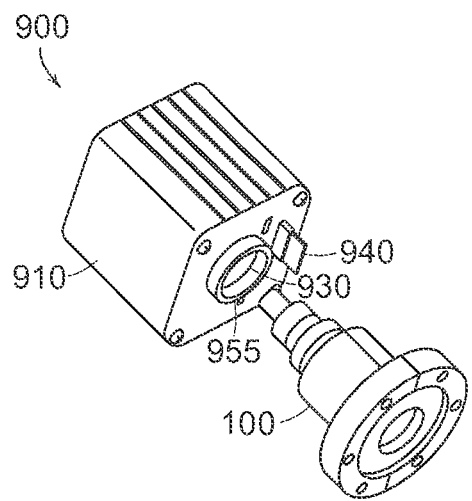
FIG. 9A is a perspective view of an electronics module and cold cathode ionization vacuum gauge prior to assembly.

The cold cathode ionization vacuum gauge described herein combines the best features of the commercially available vacuum gauges described above by including both an optional cable and an electronics module. As shown in FIG. 9A, the vacuum gauge assembly 900 further includes an electronics module 910 configured to be directly coupled to the vacuum gauge 100 with an interface 930 complementary to the vacuum gauge 100, the module 910 housing electronics adapted to operate and read the vacuum gauge 100. The electronics module 910 can further include an interlock lever 940 configured to lock the electronics module 910 to the vacuum gauge 100. For safety reasons, it is important that the electronics module is properly locked to the vacuum gauge. If the electronics module is not properly locked to the vacuum gauge, it may expose the user to dangerous high voltage. Therefore, the electronics module can further include a gauge detector configured to detect the presence of the vacuum gauge and provide a corresponding gauge detect signal. The gauge detect signal can indicate whether or not the vacuum gauge is properly locked to the electronics module. In some aspects, the electronics module can further include a magnet (not shown) on a front face of the electronics module adapted to hold the vacuum gauge in place until the interlock is engaged.

Figure 9B:
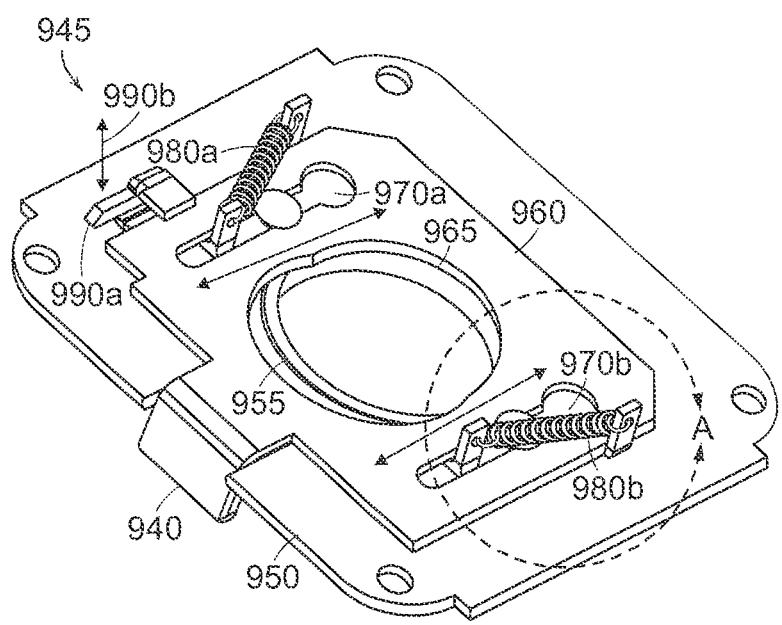
FIG. 9B is a perspective illustration of a latch interlock for the electronics module shown in FIG. 9A.
Figure 10:
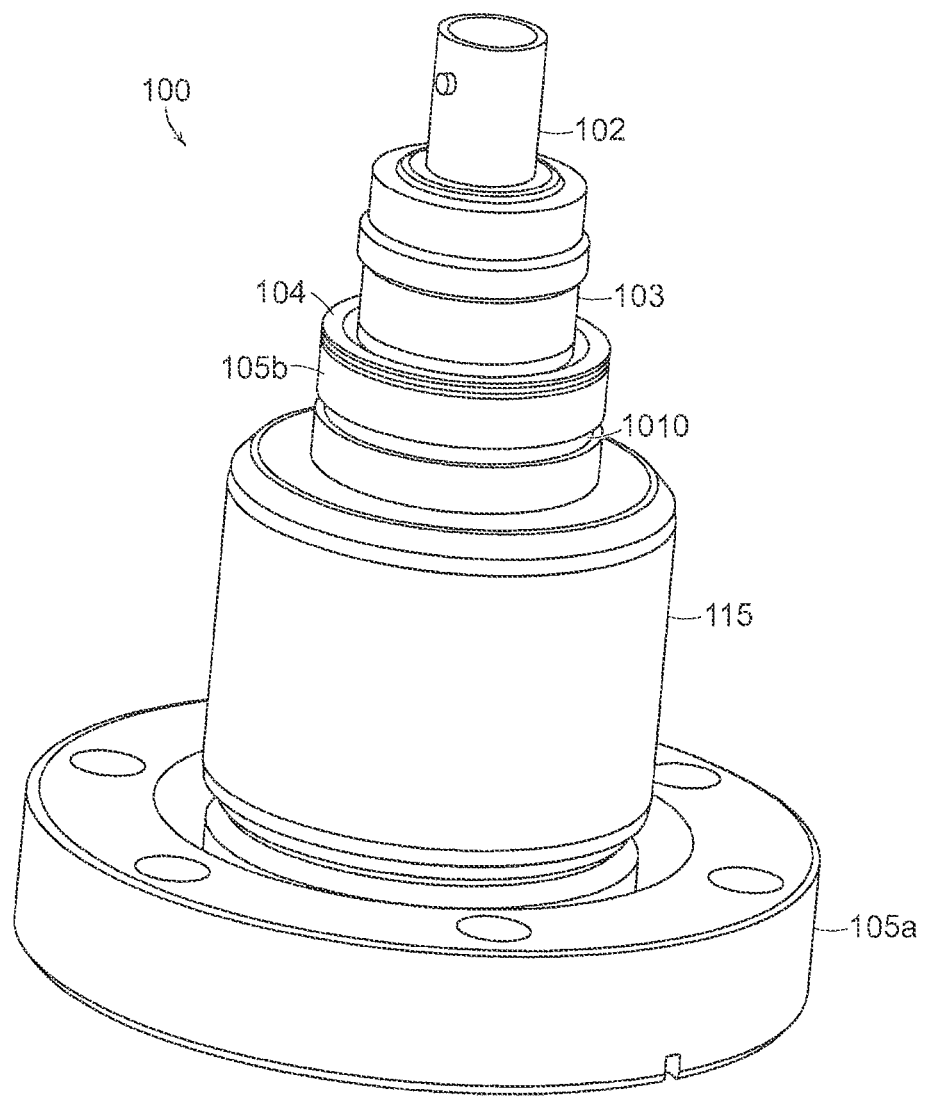
FIG. 10 is a perspective illustration of a cold cathode ionization vacuum gauge.

As shown in FIG. 9B, where the interlock 945 with lever 940 is shown upside down from the view shown in FIG. 9A for a better view of the component parts discussed below, the interlock 945 can include a latch made up of a ring 955 that is pressed in a plate 950 and a surface 965 on a second plate 960. The two surfaces 955 and 965 lock, as shown in FIG. 10, into a groove 1010 on the vacuum gauge 100 to secure the connection between the electronics module 910 and the vacuum gauge 100 (see FIG. 9A). Turning back to FIG. 9B, the plate 960 slides against plate 950 in key slots 970a and 970b against tension provided by springs 980a and 980b that keep the latch 945 in the normally closed position shown in FIG. 9B. When the interlock lever 940 is pushed in, the latch opens, the surfaces 955 and 965 forming a perfect circle, and the vacuum gauge 100 can pass through the latch 945.

To detect the interlock of the vacuum gauge with the electronics module, the position of the plate 960 is detected. To detect the position of the plate, a finger 990a is carried by the plate 960. When the interlock 945 is not engaged, the gauge detector finger 990a depresses a gauge detector button shown schematically at 990b; that is, the button is pushed up in FIG. 9B. As the interlock lever 940 is engaged and pushed in, the latch 945 starts to open and the gauge detector finger 990a moves in the same direction as the interlock lever releasing the button to move down in FIG. 9B. When the vacuum gauge passes through the latch 945 and the surfaces 955 and 965 lock into the groove 1010 on the vacuum gauge, the finger 990a is held away from underneath the button 990b. In this configuration, the gauge detector lever 990a does not make contact with the gauge button 990b. A gauge detect signal can be triggered in this configuration to indicate that the vacuum gauge is properly locked to the electronics module.

The design shown in FIG. 10 yields an all-metal gauge with no o-rings and with the ability to remove the magnet assembly 115 without any tools, by sliding the magnet assembly 115 upwards as shown in FIG. 1B (see magnet assembly 115, which slides over cathode 120 and connects to magnetic coupler 116, with the aid of locating pin 117 as described above), enabling high-temperature (e.g., 250° C.) bakeout.

Figure 11A:
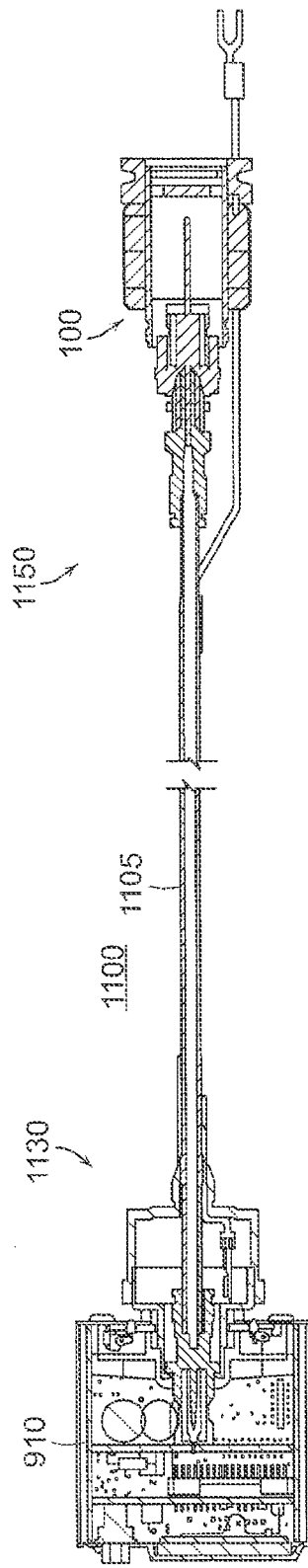
FIGS. 11A-11C are cross-sectional illustrations of a cable connecting the electronics module to the cold cathode ionization vacuum gauge.
Figure 11B:
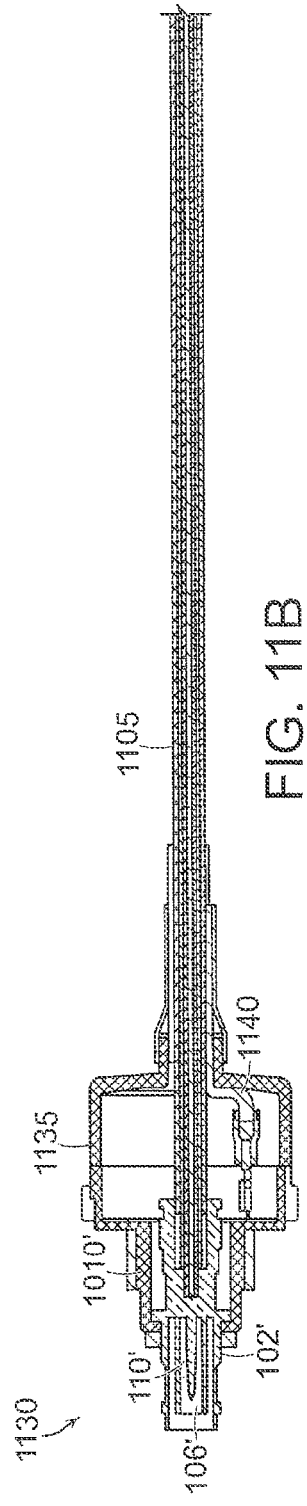
Figure 11C:
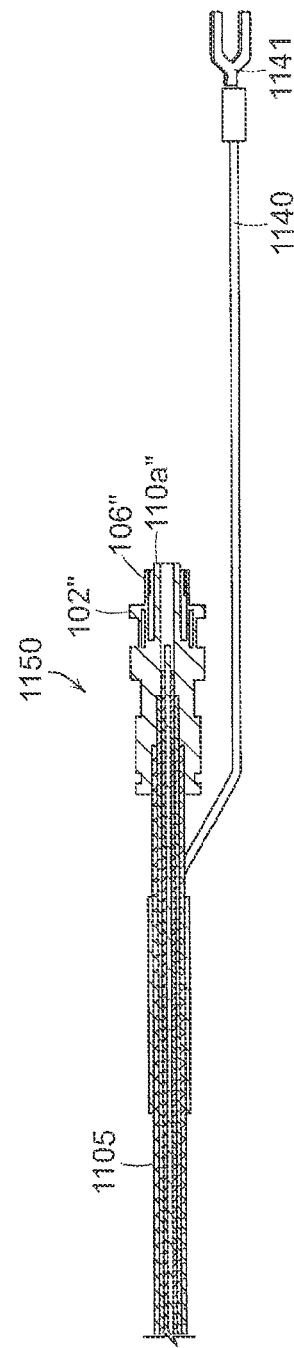
Figure 11D:
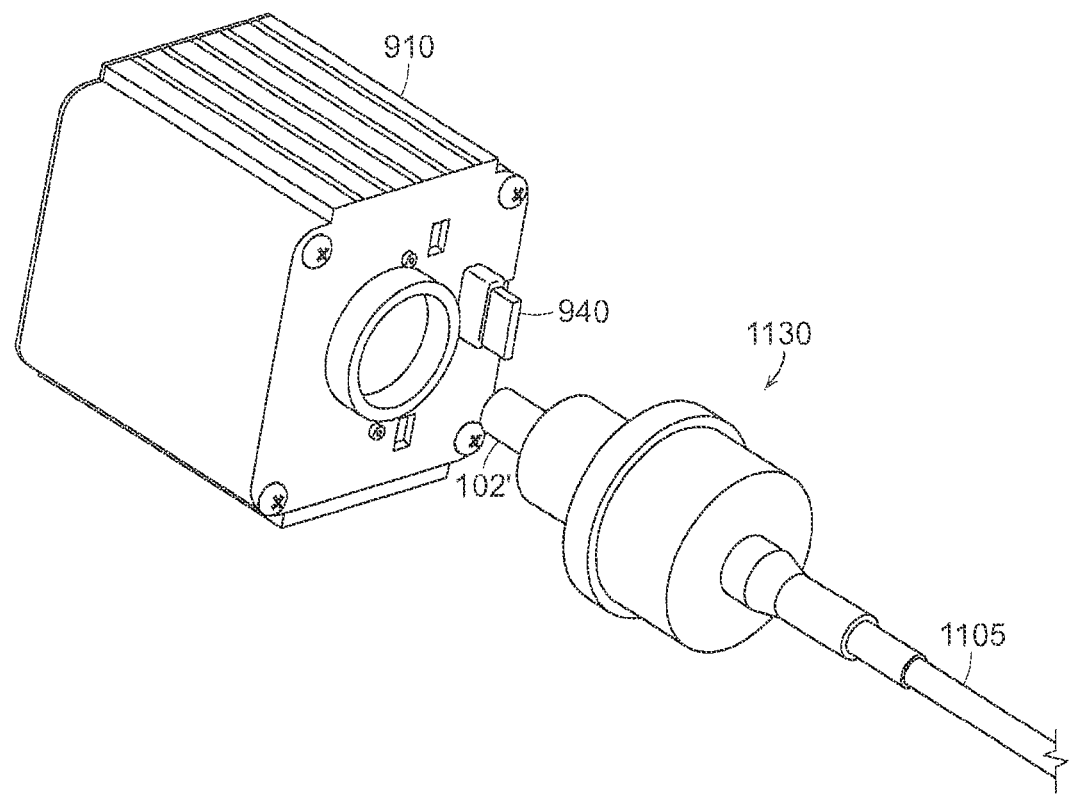
FIG. 11D is a perspective view of an electronics module and cable end that imitates physical mating surfaces of a cold cathode ionization vacuum gauge.

As shown in FIGS. 11A-11D, the vacuum gauge assembly 1100 can further include a cable 1105 between the electronics module 910 and the vacuum gauge 100, with the vacuum gauge 100 and electronics module 910 displaced from each other. As shown in FIG. 11B, the cable 1105 has a first end 1130 comprising a central anode connection pin, an anode guard insulator spaced from and surrounding the anode connection pin, a guard ring connection surrounding and spaced from the anode guard ring insulator and an outer cylindrical insert having an interlock groove. Also shown in FIG. 11B, the cable 1105 has a first end 1130 that includes surfaces denoted with primes that imitate physical mating surfaces of the vacuum gauge 100 shown in FIGS. 1A-1C, including guard ring connection 102', anode guard ring insulator 106', anode connection 110a', and the groove 1010' that locks into interlock 940 described above. The interlock can be configured to detect the presence of the first end of the cable. A signal, similar to the gauge detect signal described earlier, can be triggered to indicate that the first end of the cable is properly locked to the electronics module. The first end 1130 also includes a wire connection 1140 inside a housing 1135. The wire connection 1140 is connected to the outer shield of the cable 1105, and serves to make the (grounded) connection to the cathode by connecting the u-shaped clip 1141, shown in FIG. 11C, around a bolt on the outer flange 105a (not shown). The housing 1135 is shown open into two halves 1135a and 1135b in FIG. 11E, where retaining ring 1136 that holds the physical mating surfaces in place is also shown. As shown in FIG. 11D, the electronics module 910 can further include an interlock 940 (shown in the open position in FIG. 11D) configured to lock to the first end 1130.

The cable 1105 also includes a second end 1150, shown in FIG. 11C, that is configured to imitate physical mating surfaces, denoted with double primes in FIG. 11C, of the electronics module 910 to mate to the vacuum gauge 100. As shown in FIG. 11C, the second end 1150 includes guard ring mating surface 102", guard ring insulator mating surface 106", and anode connection 110a" as well as wire 1140 and clip 1141 discussed above.

Methods of operating a cold cathode ionization vacuum gauge described herein include setting a voltage potential difference to form an electrical discharge between the anode electrode and the cathode electrode, measuring a discharge impedance between the anode electrode and the cathode electrode, and deriving a pressure reading therefrom.

Figure 12:
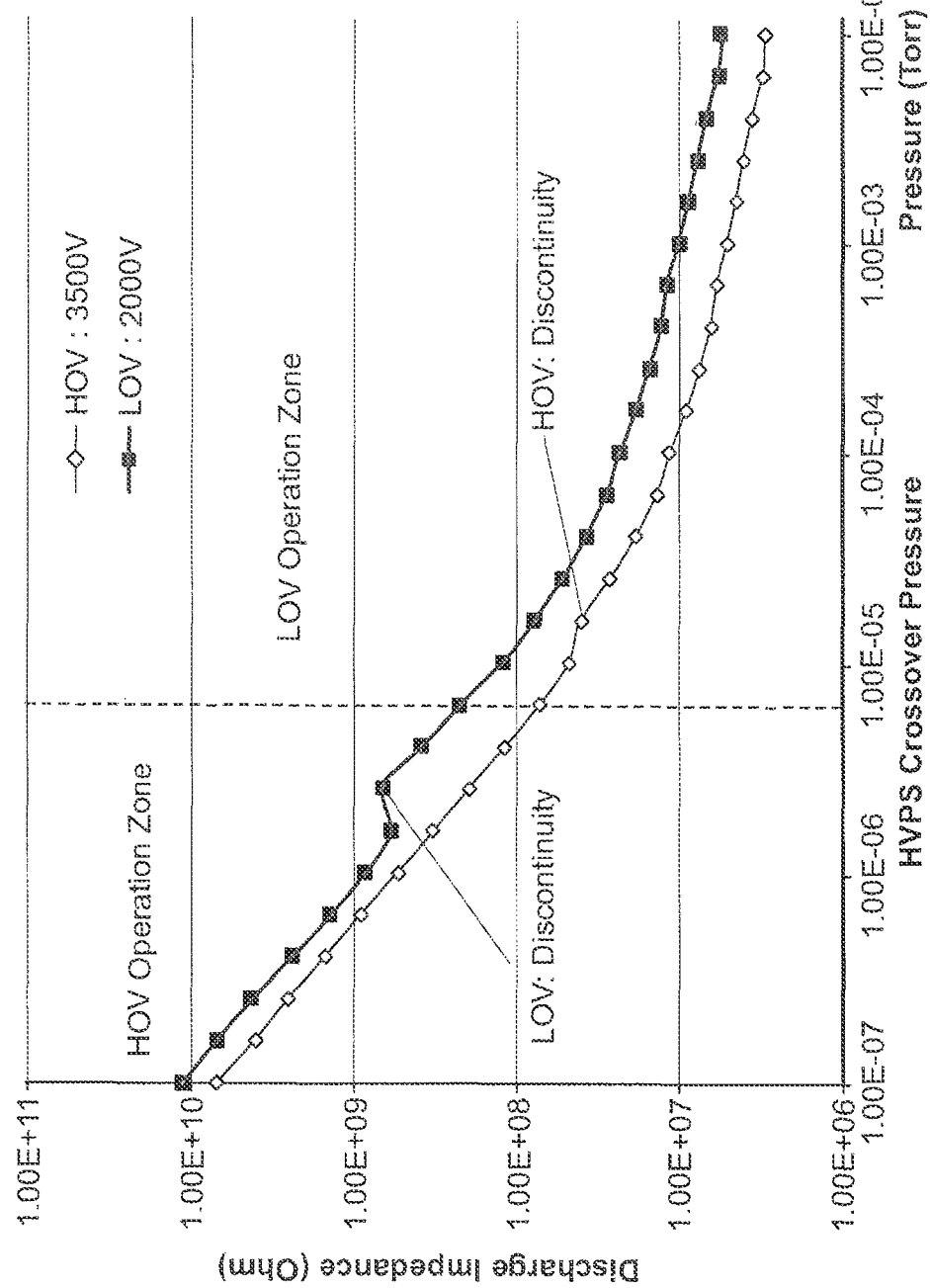
FIG. 12 is a graph of discharge impedance (ohm) as a function of pressure (Torr) showing an example of a low operating voltage discontinuity (LOV:Discontinuity), and an example of a high operating voltage discontinuity (HOV: Discontinuity) for a cold cathode ionization vacuum gauge.

In one aspect, a method of operating a cold cathode ionization vacuum gauge includes switching the voltage potential difference between a high voltage setting and a low voltage setting at a lower pressure than that of a high voltage measurement anomaly and at a higher pressure than that of a low voltage measurement anomaly. Measurement anomalies or discontinuities in the calibration curves for current and voltage as a function of pressure in cold cathode ionization vacuum gauges are well known. See P. A. Redhead, *Instabilities in crossed-field discharges at low pressures*, Vacuum vol. 38 pp. 901-908 (1988). These measurement anomalies are dependent on the specific geometry of the gauge, and occur over a limited pressure range at particular voltages. For example, as shown in FIG. 12, the cold cathode ionization vacuum gauges described herein typically exhibit a discontinuity (a sudden jump in the measured quantity (e.g., impedance or discharge current as described below)) at about $5\times10^{-6}$ Torr for a voltage potential difference of 2,000 V (i.e., a low voltage measurement anomaly), and a discontinuity at about $1\times10^{-5}$ Torr for a voltage potential difference of 3,500 V (i.e., a high voltage measurement anomaly).

Figure 13:
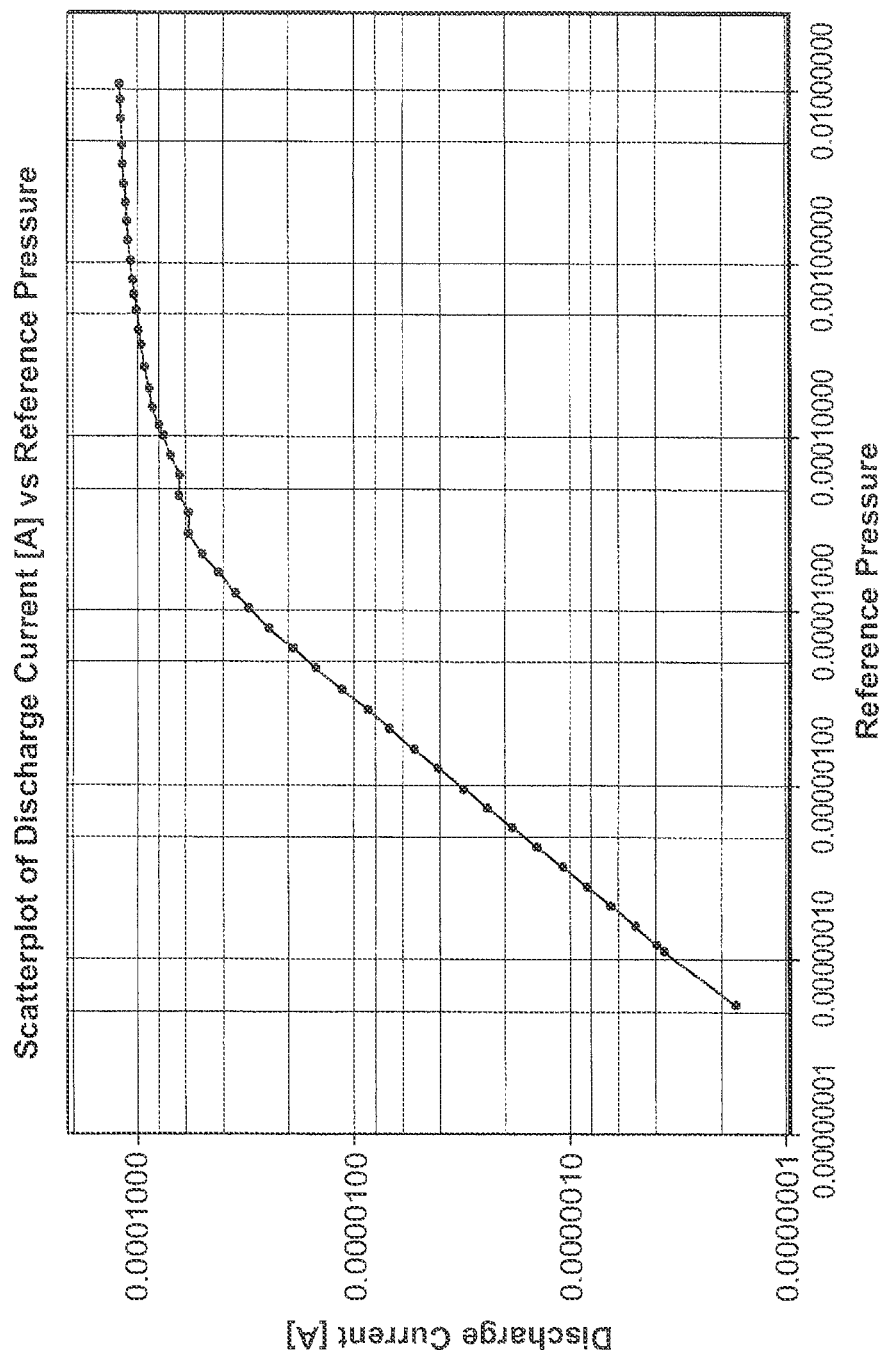
FIG. 13 is a graph of discharge current (A) as a function of pressure (Torr) for a cold cathode ionization vacuum gauge.
Figure 14:
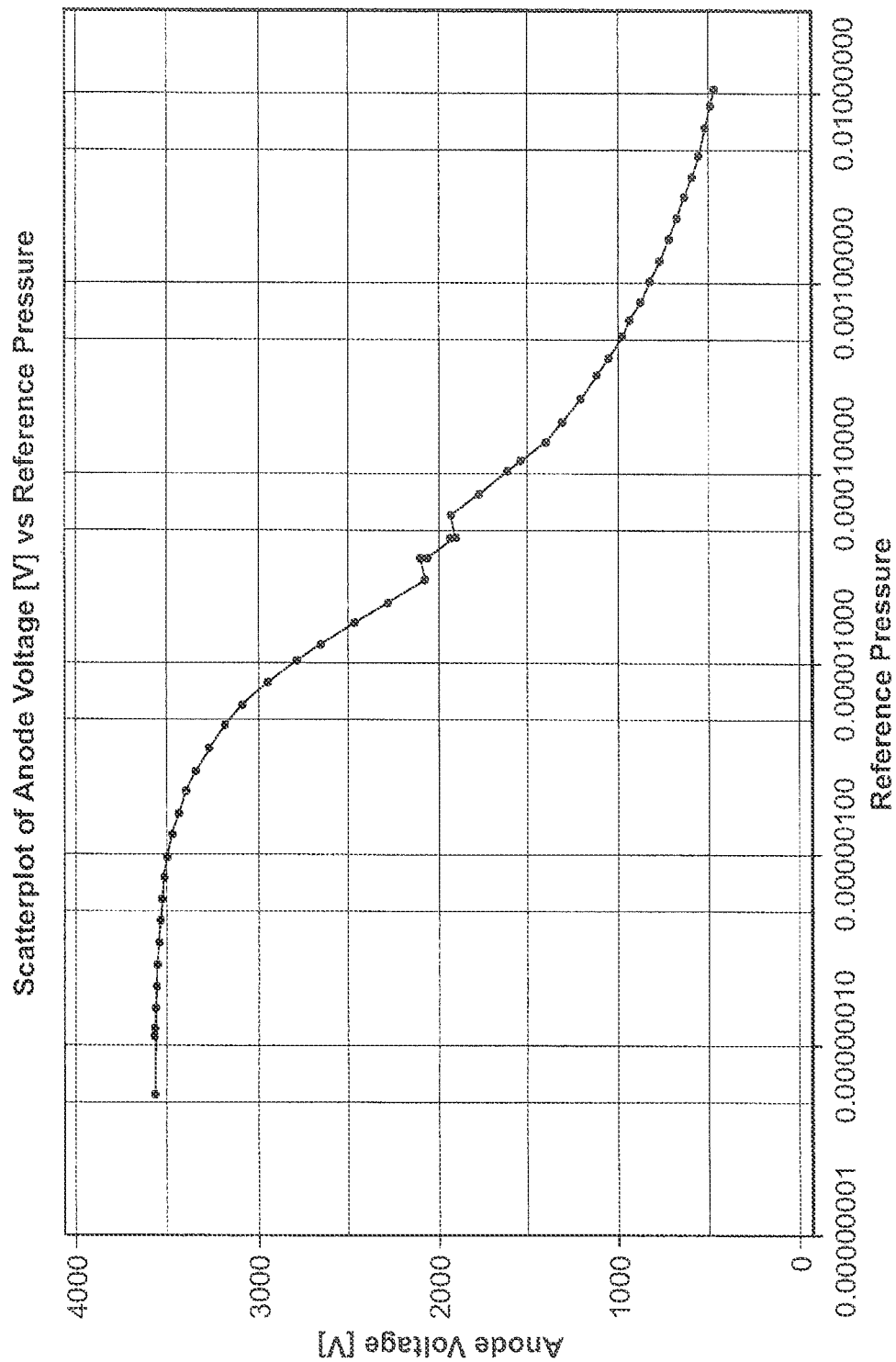
FIG. 14 is a graph of anode voltage (volts) as a function of pressure (Torr) for a cold cathode ionization vacuum gauge.
Figure 15:
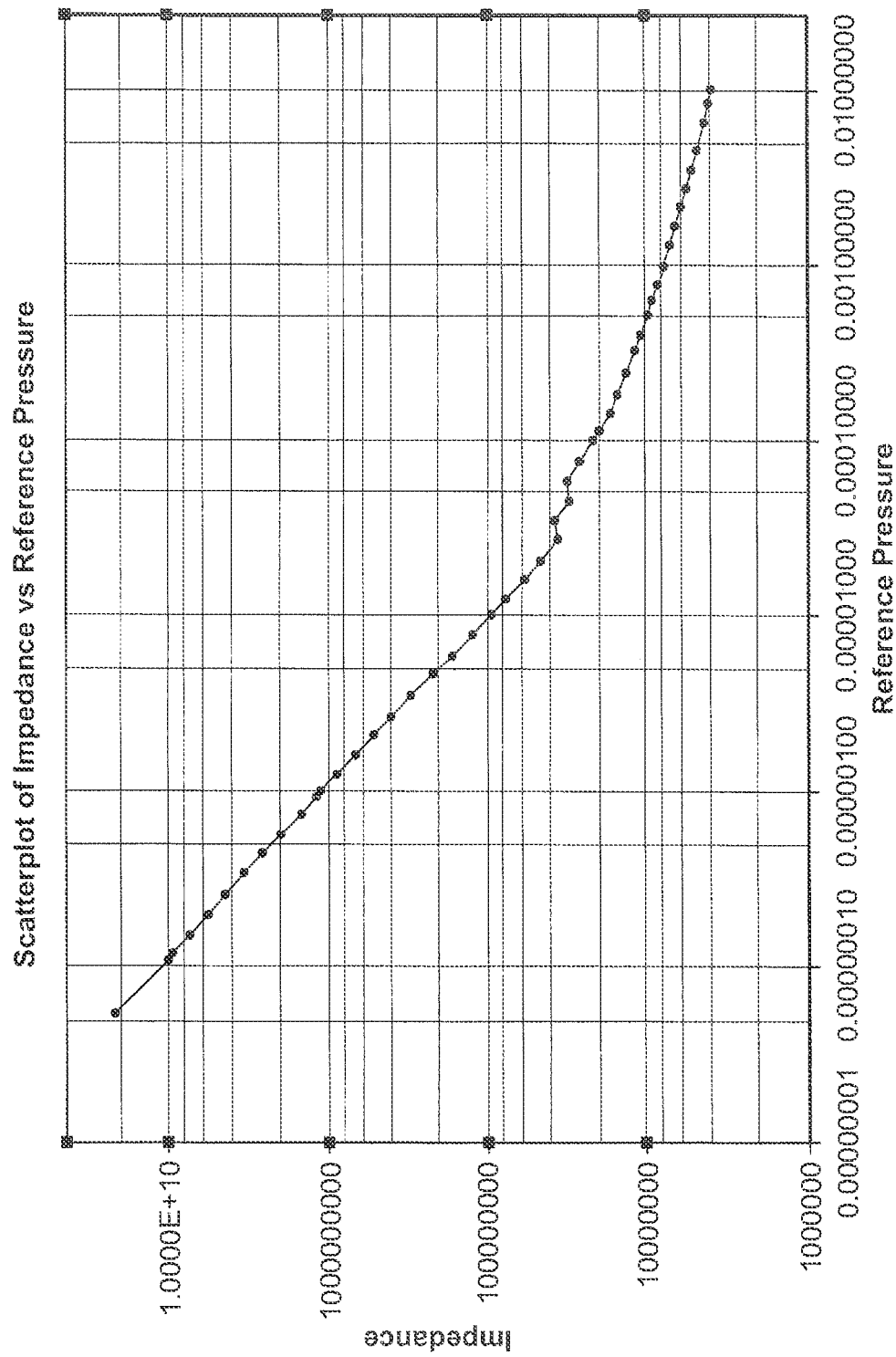
FIG. 15 is a graph of discharge impedance (ohm) as a function of pressure (Torr) for a cold cathode ionization vacuum gauge.

The high voltage measurement anomaly and the low voltage measurement anomaly can be discharge current anomalies, or discharge impedance anomalies. As shown in FIG. 13, a graph of discharge current as a function of pressure shows that the discharge current becomes non-linear at pressures higher than about $1\times10^{-5}$ Torr, asymptotically reaching a maximum discharge current. As shown in FIG. 4, this current limit is due to a limiting resistor 410 in the discharge current measurement circuit, which sets an upper limit on the discharge current, thereby preventing excessive sputtering of the cathode electrode. Consequently, as shown in FIG. 14, at pressures higher than about $1\times10^{-5}$ Torr, the anode voltage decreases. Therefore, in order to derive a pressure reading over a larger pressure range, the discharge impedance Z ($Z=V/I_D$) is calculated as a function of pressure, because the discharge impedance remains substantially linear over a wider pressure range, as shown in FIG. 15. See U.S. Pat. No. 4,967,157.

Turning back to FIG. 4, the limiting resistor 410 is placed between the anode electrode 110 and the high voltage power supply 430 (HVPS). The role of the limiting resistor 410 is to put an upper limit to the amount of discharge current that can flow through the discharge volume 130 and to extend the lifetime of the vacuum gauge. As a result of the limiting resistor 410, the actual high voltage bias present at the anode electrode 110 and measured by voltmeter 420 is generally smaller than the voltage delivered by the HVPS 430. In fact, the anode voltage decreases as the pressure increases, even though the output of the HVPS 430 remains constant at all pressures. In the vacuum gauge described herein, a 25 Megaohm (MΩ) limiting resistor 410 was selected to provide several advantages: 1. a safety limit to the amount of current the HVPS can deliver to an individual in case of accidental contact with internal HVPS components, 2. the choice of resistor moves pressure curve discontinuities into the higher pressure range above $1\times10^{-6}$ Torr, and 3. provides an upper limit for the discharge current of 125 µA. The cold cathode gauge controller 490 ensures that the output of the HVPS 430 is constant over the entire pressure range while at the same time continuously measures the anode voltage V with voltmeter 420 and discharge current $I_D$ with ammeter 460 to calculate discharge impedance Z as a function of pressure.

In order to avoid discontinuities, it is important to avoid reaching the voltages that lead to discontinuities at pressures that support those discontinuities. One possible solution to avoid discontinuities is to operate the CCIVGs with low anode voltages and the smallest possible current limiting resistor, for example, by using a 2.0 kV High Voltage Supply and a 20 MΩ limiting resistor to make sure that the anode voltage remains below the discontinuity voltage throughout the entire range of the gauge. Operating the CCIVG with a low High Voltage supply, such that the anode voltage remains below the voltages that lead to discontinuities, is a good approach, because the resulting current and impedance curves do not have large discontinuities. However, the sensitivity of the gauge is lower at a low anode voltage potential difference, as a result of the reduced electric field inside the ionization volume. For example, the cold cathode ionization vacuum gauge described herein has a sensitivity as large as 12 A/Torr for a 5 kV high voltage setting, but decreases to 1 A/Torr at 2 kV. The solution described herein is to operate the gauge at two different voltage settings, a high voltage setting at low pressure, and a low voltage setting at higher pressure. The high voltage setting can be in a range of about 3.5 kV to about 6 kV, and the low voltage setting can be in a range of about 2 kV to about 3 kV. Turning back to FIG. 12, the vacuum gauge controller begins operating the vacuum gauge with the output of the high voltage power supply (HVPS) at the high voltage setting, and automatically shifts the output of the HVPS to the low voltage setting as the pressure crosses the HVPS crossover pressure. The vacuum gauge controller includes calibration curves to derive pressure at both the high voltage setting and the low voltage setting. Switching the voltage potential difference between a high voltage setting and a low voltage setting at a lower pressure than that of a high voltage measurement anomaly and at a higher pressure than that of a low voltage measurement anomaly avoids both the high voltage measurement anomaly (HOV: Discontinuity shown in FIG. 12) on the high pressure side of the HVPS Crossover Pressure level, and the low voltage measurement anomaly (LOV: Discontinuity shown in FIG. 12) on the low pressure side of the HVPS Crossover Pressure level, as shown in FIG. 12. Switching to several different voltage settings, and not just between a high voltage setting and a low voltage setting, could be implemented to avoid multiple discontinuities.

In addition to avoiding discontinuities, the dual voltage mode of operation provides several additional advantages: 1. It provides the ability to increase the anode voltage levels at low pressures without having to worry about the effects of higher pressures. This is ideal for UHV operation where a gauge could operate at a very high voltage for UHV measurement and switches to a much lower voltage before the discontinuity is reached. This provides high sensitivity at UHV, avoids the discontinuities, and provides protection of the gauge at higher pressures where a low voltage minimizes sputtering. Operation at high voltage at UHV provides better sensitivity and also faster start times. 2. It provides the ability to avoid discontinuities providing improved accuracy and repeatability. 3. It provides lower wear and tear at high pressures by minimizing sputtering.

Minimizing sputtering is important for the lifetime of a cold cathode ionization vacuum gauge, but there are circumstances when a higher discharge current is tolerable during normal operation of the vacuum gauge. Another method of operating a cold cathode ionization vacuum gauge includes measuring a leakage electrical current between an electrically conductive guard ring electrode interposed between the cathode electrode and the anode electrode about a base of the anode electrode, and triggering a gauge maintenance alarm if the pressure reading is less than an oscillatory discharge current pressure level and the leakage electrical current is greater than a maximum allowable leakage current limit. The oscillatory discharge current pressure level can be about $5 \times 10^{-6}$ Torr. The maximum allowable leakage current limit can be about 1 µA. Turning back to FIG. 4, the two independent ammeters (460, 470) in the controller electronics 490 enable independent measurement of the plasma discharge current ($I_D$) by ammeter 460 and the guard ring current ($I_{GR}$), which is the sum of the starter field emission ($I_{FE}$) current and feedthrough leakage current ($I_L$), by the other ammeter 470. The controller 490 monitors the guard ring current $I_{GR}$ so that this current does not exceed a maximum allowable current value, such as 1 µA. The starter field emission current $I_{FE}$ is typically below 20 nA, and therefore as soon as any significant contamination builds up on the feedthrough 103, the feedthrough leakage current $I_L$ is much greater than the starter field emission current $I_{FE}$, and therefore the feedthrough leakage current $I_L$ is responsible the majority of the guard ring current $I_{GR}$. However, at pressures greater than, for example, about $5 \times 10^{-6}$ Torr (the oscillatory discharge current pressure level), the vacuum gauge can experience oscillatory discharge currents that develop along the gauge axis, and also reach the guard ring. As a result, the current measured by the guard ring ammeter 470 can be substantially larger than the 1 µA limit, such as in a range of about 1 to about 5 µA, but that is not a valid reason to trigger a gauge maintenance alarm and stop operation of the gauge, because the high current level does not actually indicate excessive contamination of the feedthrough 103.

Oscillatory discharge currents are not expected below a certain pressure, which is dependent on the particular design of the vacuum gauge. Therefore, if the maximum allowable leakage current limit is exceeded and the pressure is less than the oscillatory discharge current pressure level, i.e., where oscillatory discharge currents are not expected, then it is likely that the gauge has developed excessive feedthrough leakage current and/or starter field emission current and a gauge maintenance alarm is triggered. If, on the other hand, the maximum allowable leakage current limit is exceeded and the pressure is higher than the oscillatory discharge current pressure level, then it is likely that oscillatory discharge currents are responsible for the increase in current and no gauge maintenance alarm is triggered. The specific oscillatory discharge current pressure level depends on the gauge design and operational conditions. To check on the operational viability of the gauge, the gauge needs to be evacuated to a pressure below the oscillator discharge current pressure level and the feedthrough leakage current needs to be measured and compared to the maximum allowable leakage current limit.

Yet another method of estimating the operational viability of a cold cathode ionization vacuum gauge includes measuring a discharge current between the anode electrode and the cathode electrode, and deriving a pressure reading therefrom, recording the discharge current as a function of time, and integrating the discharge current over time to obtain a pressure dose for the vacuum gauge. Pressure dose as a measure of the effective lifetime of cold cathode ionization vacuum gauges was introduced by Wilfert and Schindler in 2004. See St. Wilfert and N. Schindler, Applied Physics A vol. 78, pp. 993-666 and 691-694 (2004). Wilfert and Schindler integrated the measured pressure over time to obtain the pressure dose PD(T) according to the expression $$PD(T) = \int_0^T P(t)dt \qquad (2)$$

where P(t) is the pressure measured at time t, and T is the elapsed time (hours) since the beginning of measurements. They concluded that a cold cathode ionization vacuum gauge operated in a typical residual gas environment has an accuracy degradation in a range of about 10% to about 30% after a pressure dose of 1.1 mbar*h.

Integrating the measured pressure is not suitable at high pressures for cold cathode ionization vacuum gauges that have limiting resistors, because, as discussed above, for such vacuum gauges the pressure is not directly related to the discharge current, and it is more likely that the discharge current is responsible for the accuracy degradation of the gauge due to sputtering of the cathode. The pressure dose expression converted to discharge current is $$PD(T) = \int_0^T I_D(t)\,dt \qquad (3)$$

where $I_D(t)$ is the discharge current at time t, and T is the elapsed time since the beginning of measurements. The Wilfert and Schindler 1.1 mbar*h converts to an integrated charge of about 3,600 Coulombs.

The method can further include recording and integrating a gas factor as a function of time, to account for gas species dependent sputtering rates, using the expression $$PD(T) = \int_0^T G(t) I_D(t)\,dt \qquad (4)$$

where G(t) is a gas species factor at time t (default is equal to 1 for nitrogen), $I_D(t)$ is the discharge current at time t, and T is the elapsed time since the beginning of measurements.

The method can further include recording and integrating an ion energy factor as a function of time, because the ion energy is likely to affect the sputtering rate of the cathode. The integration over time of the sputtering rate provides a closer approximation of the pressure dose. The sputtering rate depends on the discharge current (i.e., the number of ions hitting the cathode per unit time) and it is weighted by the gas species and the energy of the ions reaching the cathode. An energy factor is therefore introduced to account for the fact that the energy of the ions depends on the pressure (i.e., the anode voltage changes with pressure, due to the limiting resistor discussed above). The expression including the energy factor is $$PD(T) = \int_0^T E(t) G(t) I_D(t)\,dt \qquad (5)$$

where E(t) is the energy factor at time t, G(t) is a gas species factor at time t (default is equal to 1 for nitrogen), $I_D(t)$ is the discharge current at time t, and T is the elapsed time since the beginning of measurements. The energy factor is higher at lower pressures and lower at higher pressures where the anode voltage decreases relative to the high voltage power supply output (see FIG. 14).

Additionally, the method can include determining a remaining service life for the vacuum gauge based on the pressure dose. The remaining service life is calculated using $$\text{Life}(\%) = \frac{EF * PD_{max} - PD(T)}{EF * PD_{max}} * 100\% \qquad (6)$$

where EF is an environmental factor (default=1), and $PD_{max}$ is the maximum acceptable dose (default is 3,600 Coulombs as discussed above). The environmental factor can be adjustable, enabling adjustment in the rate at which the remaining service life decreases as the pressure dose increases. An environmental factor greater than 1 allows a larger maximum pressure dose, increasing the service life of the vacuum gauge. Vacuum gauge that operate in more benign environments or ones that can tolerate larger changes in sensitivity before replacement of the vacuum gauge can use an EF>1. On the other hand, vacuum gauges that operate in harsher environments (e.g., including exposure to corrosive gases, such as chlorine) or ones that need to provide higher accuracy can use an EF<1, leading to more frequent replacement of the vacuum gauge. The remaining service life diminishes from 100% to 0% as the pressure dose progresses from 0 Coulombs to ($PD_{max}$*EF).

The relevant teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A cold cathode ionization vacuum gauge comprising:
   an extended anode electrode;
   a cathode electrode surrounding the anode electrode along its length and forming a discharge space between the extended anode electrode and the cathode electrode;
   a removable anode sleeve comprising a thin walled tube on the extended anode electrode that provides an electrical connection to the extended anode electrode and shields the extended anode electrode surface from contaminants along a substantial length thereof in the discharge space;
   an electrically conductive guard ring electrode interposed between the cathode electrode and the extended anode electrode about a base of the extended anode electrode and electrically isolated from the cathode electrode to collect leakage electrical current from the extended anode electrode; and
   a discharge starter device disposed over and electrically connected with the guard ring electrode, the starter device having a plurality of tips directed toward the extended anode electrode and forming a gap between the tips and the extended anode electrode.

2. The cold cathode ionization vacuum gauge of claim 1, wherein the plurality of tips is numbered in a range of 2 tips to 8 tips.

3. The cold cathode ionization vacuum gauge of claim 1, wherein the plurality of tips is numbered in a range of 5 tips to 7 tips.

4. The cold cathode ionization vacuum gauge of claim 1, wherein the gap between the tips and the extended anode electrode is in a range of between about 500 μm and about 2500 μm.

5. The cold cathode ionization vacuum gauge of claim 1, wherein the discharge starter device is made of stainless steel.

6. The cold cathode ionization vacuum gauge of claim 1, wherein a voltage potential difference between the discharge starter device and the extended anode electrode is increased during startup of the gauge.

7. The cold cathode ionization vacuum gauge of claim 1, further including a baffle across an opening of the cathode electrode to limit flow of sputtered material to a monitored chamber and of material from the monitored chamber into the discharge space, the baffle including a closed central surface facing an end of the extended anode electrode and including peripheral openings.

8. The cold cathode ionization vacuum gauge of claim 1, wherein the cathode electrode is removable.

9. The cold cathode ionization vacuum gauge as claimed in claim 1, wherein the anode sleeve is held in place on the extended anode electrode with a friction fit.

10. A cold cathode ionization vacuum gauge comprising:
an extended anode electrode;
a cathode electrode surrounding the extended anode electrode along its length and forming a discharge space between the extended anode electrode and the cathode electrode; and
a removable anode sleeve comprising a thin walled tube on the extended anode electrode that provides an electrical connection to the extended anode electrode and shields the extended anode electrode surface from contaminants along a substantial length thereof in the discharge space.

11. The cold cathode ionization vacuum gauge as claimed in claim 10, wherein the cathode electrode is removable.

12. The cold cathode ionization vacuum gauge as claimed in claim 10, wherein the anode sleeve is held in place on the extended anode electrode with a friction fit.

13. The cold cathode ionization gauge as claimed in claim 10, further comprising a baffle across the opening of the cathode electrode to limit flow of sputtered material to the chamber, the baffle including a closed central surface facing an end of the extended anode electrode and including peripheral openings.

14. A cold cathode ionization vacuum gauge comprising:
an extended anode electrode extending along a longitudinal axis;
a cathode electrode surrounding the extended anode electrode along its length and forming a discharge space between the extended anode electrode and the cathode electrode, the cathode electrode having an opening to receive gas from a monitored chamber; and
a baffle across the opening of the cathode electrode to limit flow of sputtered material to the chamber and of material from the chamber into the discharge space, the baffle including a closed central surface facing an end of the extended anode electrode and including peripheral openings.

15. The cold cathode ionization vacuum gauge of claim 14, wherein the peripheral openings of the baffle are configured as a plurality of slots disposed to direct flow at an angle with respect to the extended anode electrode.

16. The cold cathode ionization vacuum gauge of claim 15, wherein the angle of the slots is in a range of about 0 degrees to about 60 degrees.

17. The cold cathode ionization vacuum gauge of claim 14, wherein the baffle is at least two partitions, a partition facing the chamber having a central aperture and a partition facing the discharge space having the peripheral openings.

18. The cold cathode ionization vacuum gauge of claim 14, wherein the baffle is at least two partitions, a partition facing the chamber having at least one aperture and a partition facing the discharge space having the peripheral openings, the at least one aperture and the peripheral openings being displaced relative to each other such that the partitions block direct line of sight between the chamber and the cathode parallel to the longitudinal axis.

19. The cold cathode ionization vacuum gauge of claim 14, further comprising a removable anode sleeve on the anode electrode covering a substantial length thereof in the discharge space.

20. The cold cathode ionization vacuum gauge of claim 19, wherein the anode sleeve is a thin walled tube friction fit to the extended anode electrode that provides an electrical connection to the extended anode electrode and shields the extended anode electrode surface from contaminants.

21. The cold cathode ionization vacuum gauge of claim 14, wherein the cathode electrode is removable.

22. The cold cathode ionization vacuum gauge of claim 14, further comprising:
an electrically conductive guard ring electrode interposed between the cathode electrode and the extended anode electrode about a base of the extended anode electrode and electrically isolated from the cathode electrode to collect leakage electrical current from the extended anode electrode; and
a discharge starter device disposed over and electrically connected with the guard ring electrode, the starter device having a plurality of tips directed toward the extended anode electrode and forming a gap between the tips and the extended anode electrode.

23. A method of performing maintenance of a cold cathode ionization vacuum gauge having an extended anode electrode and a cathode electrode, the method comprising:
removing and replacing an anode sleeve comprising a thin walled tube on the extended anode electrode that provides an electrical connection to the extended anode electrode and shields the extended anode electrode surface from contaminants along a substantial length thereof in a discharge space.

24. The method of claim 23, further comprising removing and replacing the cathode electrode.

25. The method of claim 23, wherein the anode sleeve is held in place on the extended anode electrode with a friction fit.

* * * * *